(12) United States Patent
Sato et al.

(10) Patent No.: US 10,091,478 B2
(45) Date of Patent: Oct. 2, 2018

(54) PROJECTION DISPLAY APPARATUS

(71) Applicant: SONY CORPORATION, Tokyo (JP)

(72) Inventors: Yoshihisa Sato, Saitama (JP); Hiroyuki Yanagisawa, Kanagawa (JP); Masa Tanaka, Kanagawa (JP); Ryo Miyao, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/566,077

(22) PCT Filed: Apr. 15, 2016

(86) PCT No.: PCT/JP2016/062092
§ 371 (c)(1),
(2) Date: Oct. 12, 2017

(87) PCT Pub. No.: WO2016/175051
PCT Pub. Date: Nov. 3, 2016

(65) Prior Publication Data
US 2018/0131917 A1   May 10, 2018

(30) Foreign Application Priority Data

Apr. 30, 2015 (JP) .................. 2015-093237

(51) Int. Cl.
*G03B 21/28* (2006.01)
*H04N 9/31* (2006.01)
*G03B 33/00* (2006.01)

(52) U.S. Cl.
CPC ........... *H04N 9/3197* (2013.01); *G03B 21/28* (2013.01); *G03B 33/00* (2013.01)

(58) Field of Classification Search
CPC .. G03B 21/0056; G03B 21/006; G03B 21/28; G03B 21/208; G03B 21/2033;
(Continued)

(56) References Cited

U.S. PATENT DOCUMENTS

| 6,176,586 B1 | 1/2001 | Hirose et al. |
| 2003/0151725 A1 | 8/2003 | Hayashi et al. |

(Continued)

FOREIGN PATENT DOCUMENTS

| CN | 1841180 A | 10/2006 |
| EP | 1708512 A1 | 10/2006 |

(Continued)

OTHER PUBLICATIONS

International Search Report and Written Opinion of PCT Application No. PCT/JP2016/062092, dated Jun. 14, 2016, 13 pages of ISRWO.

*Primary Examiner* — Sultan Chowdhury
(74) *Attorney, Agent, or Firm* — Chip Law Group

(57) ABSTRACT

A first projection display apparatus includes a color separator (41A) that has first and second incident surfaces (S1a and S1b), and allows light in first to third wavelength bands to pass therethrough or reflects the light in the first to third wavelength bands; first to third reflective light modulators (15); a first polarization splitter (12G); a second polarization splitter (12RB); and a projection optical system (19). Light in at least one of the first to third wavelength bands enters the first incident surface of the color separator as first polarized light, and light in the other wavelength bands enters the second incident surface of the color separator as second polarized light orthogonal to the first polarized light.

20 Claims, 16 Drawing Sheets

(58) Field of Classification Search
CPC ............ G03B 21/2066; G03B 21/2073; H04N 9/315; H04N 9/3105; H04N 9/3161; H04N 9/3164; H04N 9/3167
See application file for complete search history.

(56) References Cited

U.S. PATENT DOCUMENTS

| | | |
|---|---|---|
| 2005/0073651 A1 | 4/2005 | Yamamoto |
| 2006/0215117 A1* | 9/2006 | Aastuen ............. G02B 27/1026 353/20 |
| 2006/0262276 A1 | 11/2006 | Kamm |
| 2009/0021699 A1* | 1/2009 | Hsu ....................... G02B 7/008 353/20 |

FOREIGN PATENT DOCUMENTS

| | | |
|---|---|---|
| JP | 11-271683 A | 10/1999 |
| JP | 2000-284228 A | 10/2000 |
| JP | 2003-233030 A | 8/2003 |
| JP | 2003-233124 A | 8/2003 |
| JP | 2004-012864 A | 1/2004 |
| JP | 2005-107412 A | 4/2005 |
| JP | 2006-343721 A | 12/2006 |
| JP | 2000-284228 A | 10/2010 |
| JP | 2015-064550 A | 4/2015 |
| JP | 2015-64550 A | 4/2015 |
| JP | 2015-082091 A | 4/2015 |
| JP | 2015-82091 A | 4/2015 |

* cited by examiner

[ FIG. 1 ]
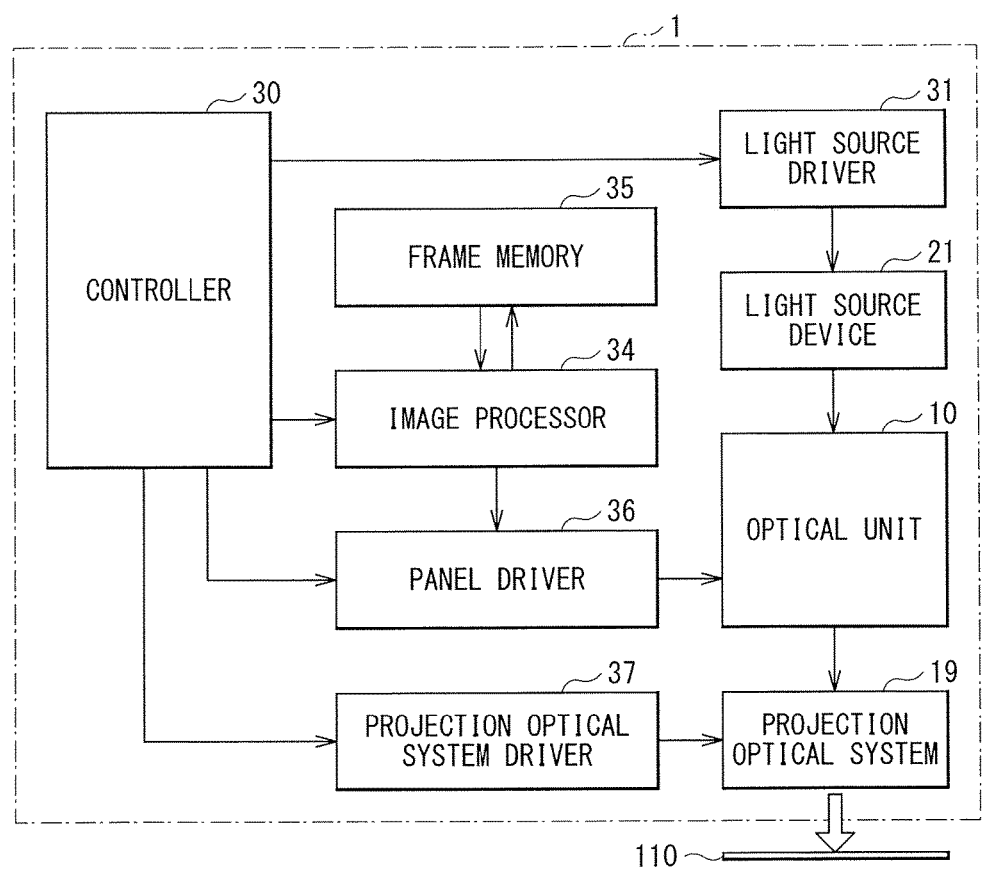

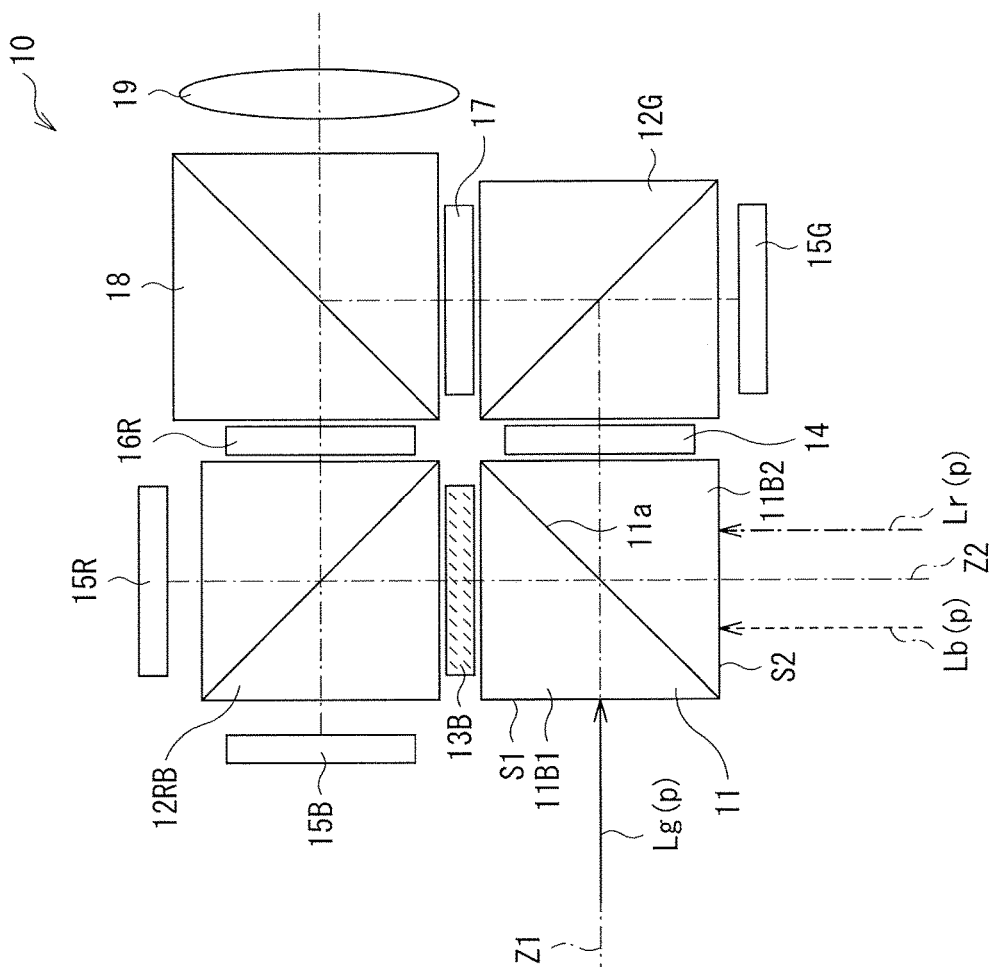
[FIG. 2]

[ FIG. 3 ]
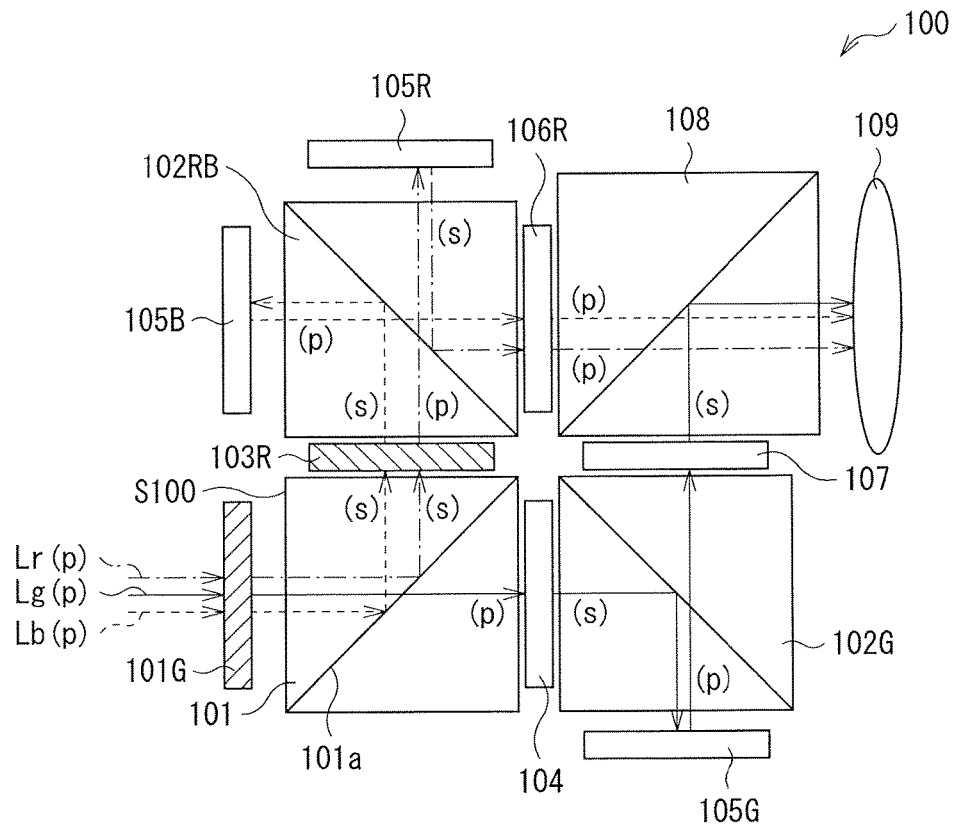
[ FIG. 4 ]
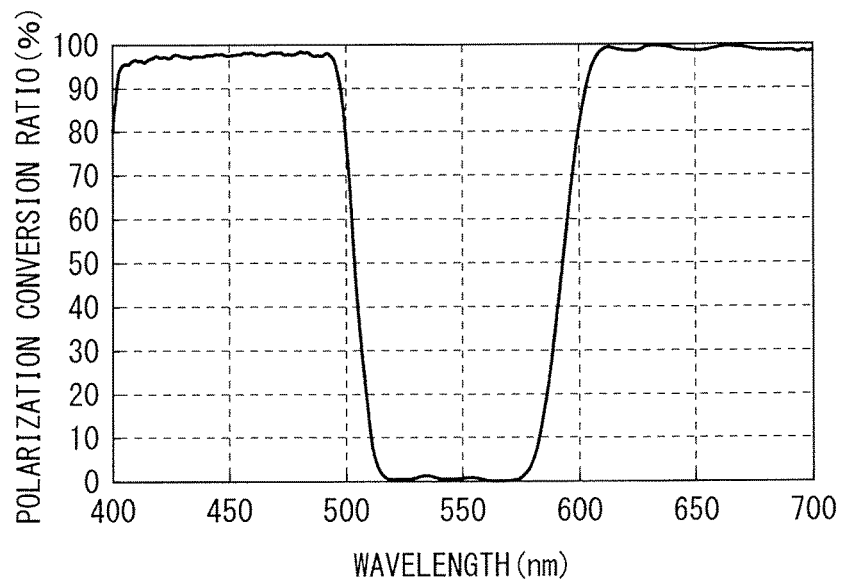

[ FIG. 5 ]
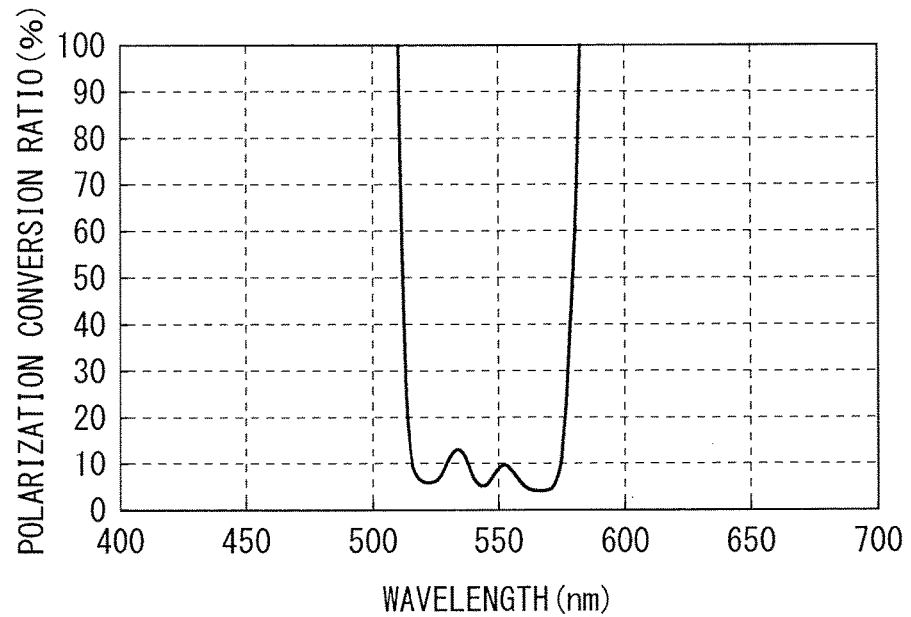
[ FIG. 6 ]
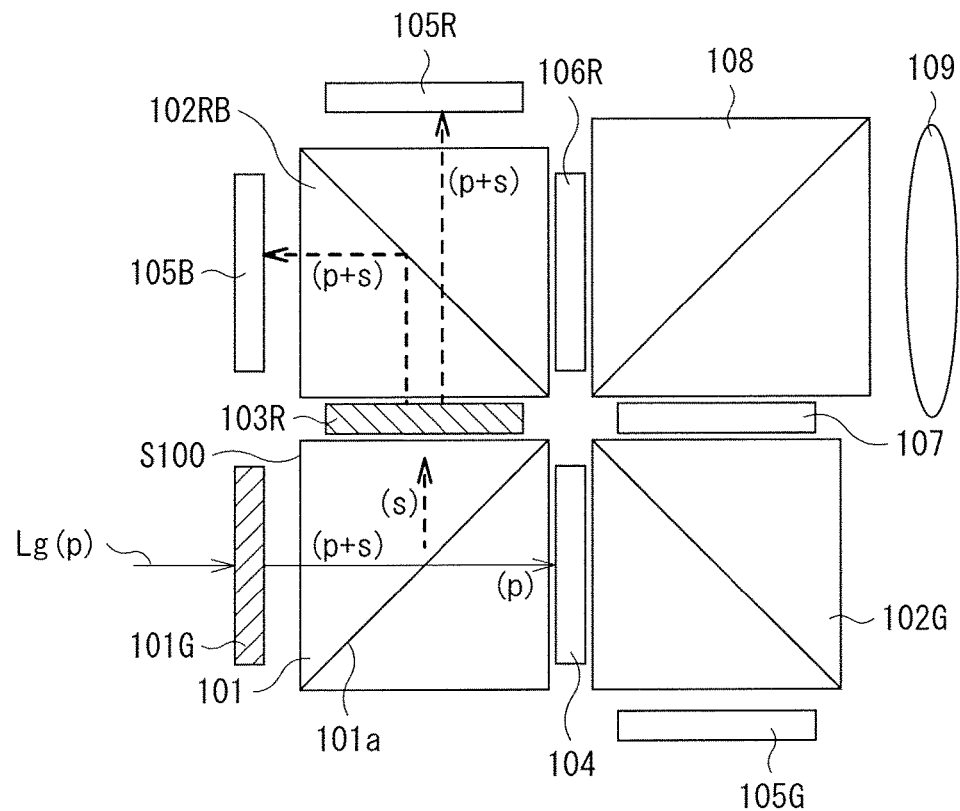

[FIG. 7]
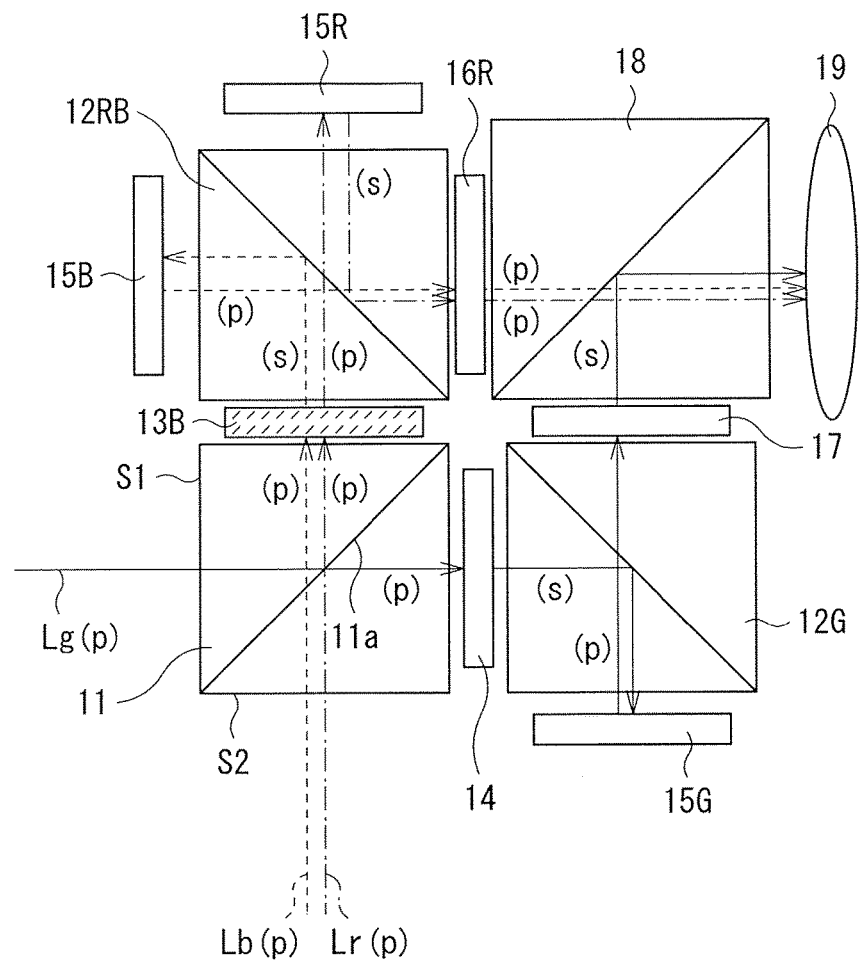

[ FIG. 8 ]
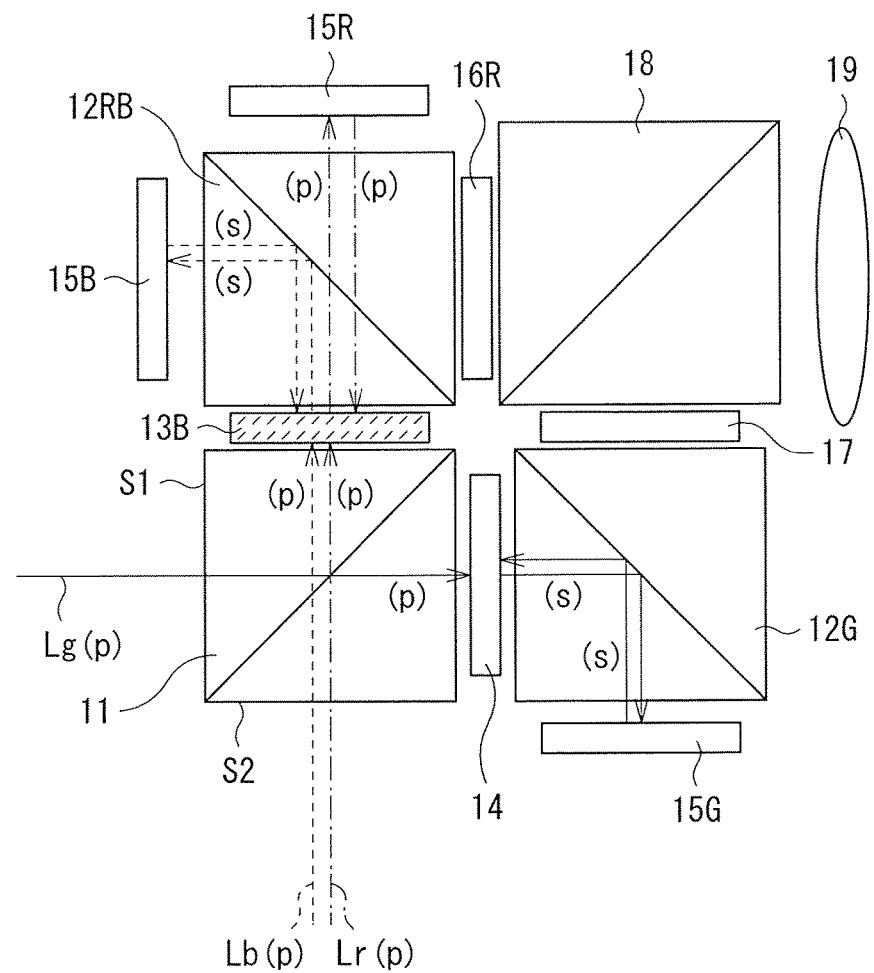

[ FIG. 9 ]
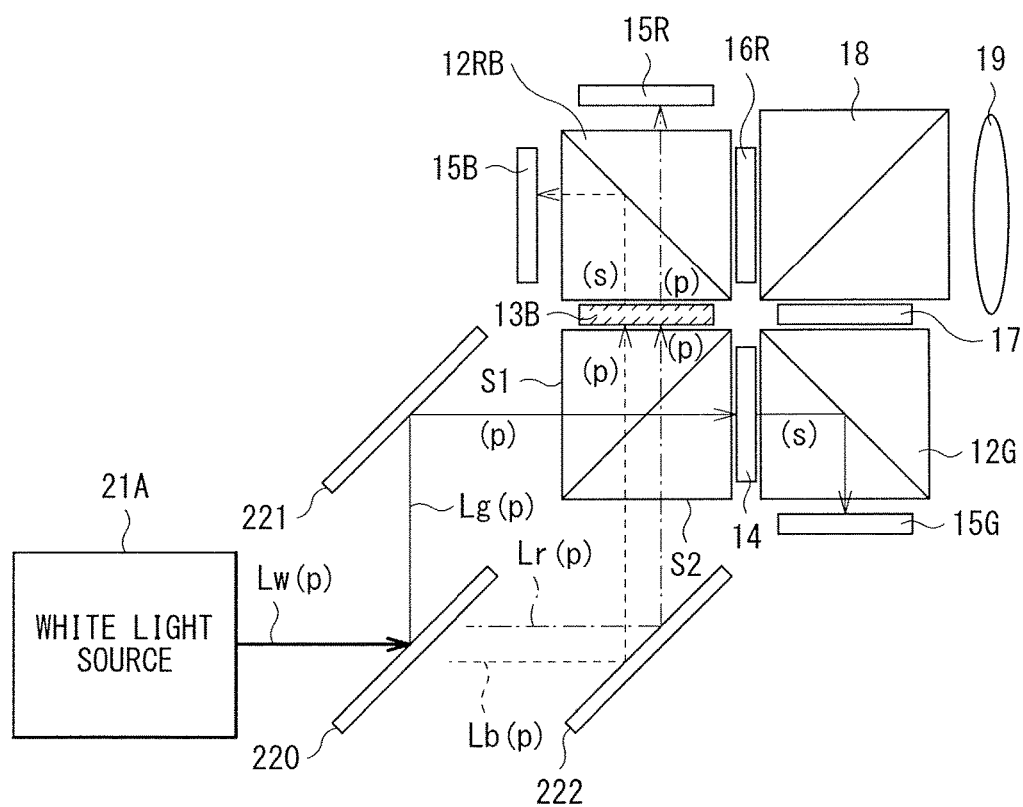

[ FIG. 10 ]
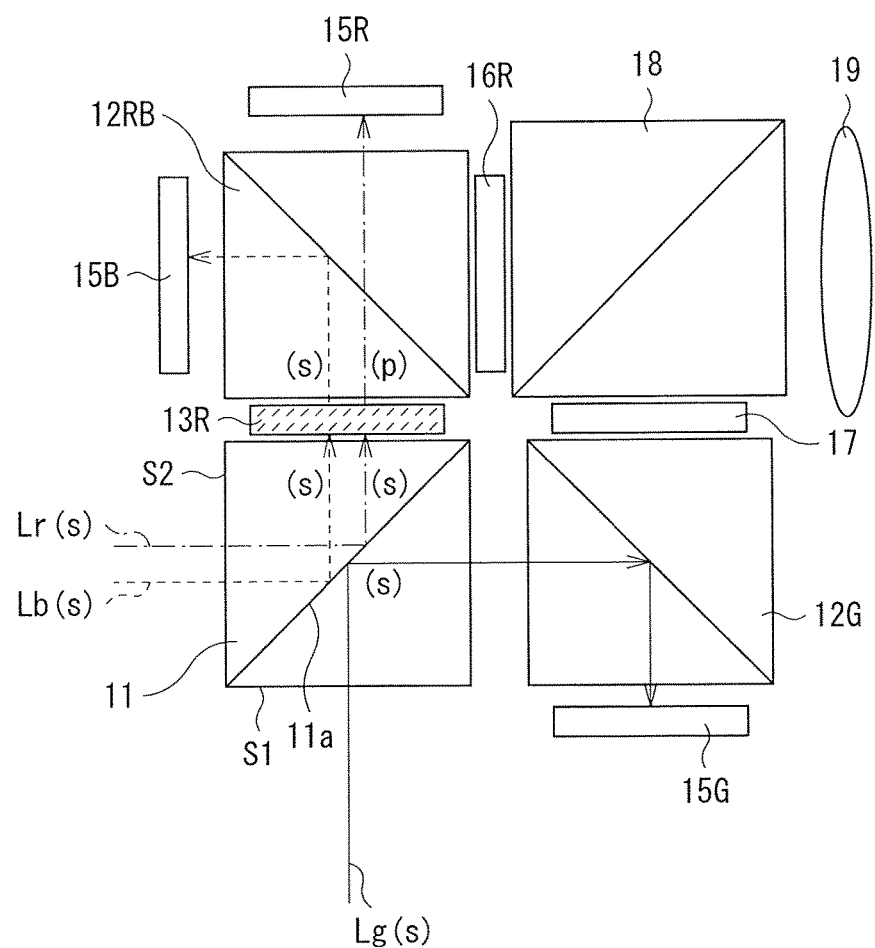

[ FIG. 11 ]
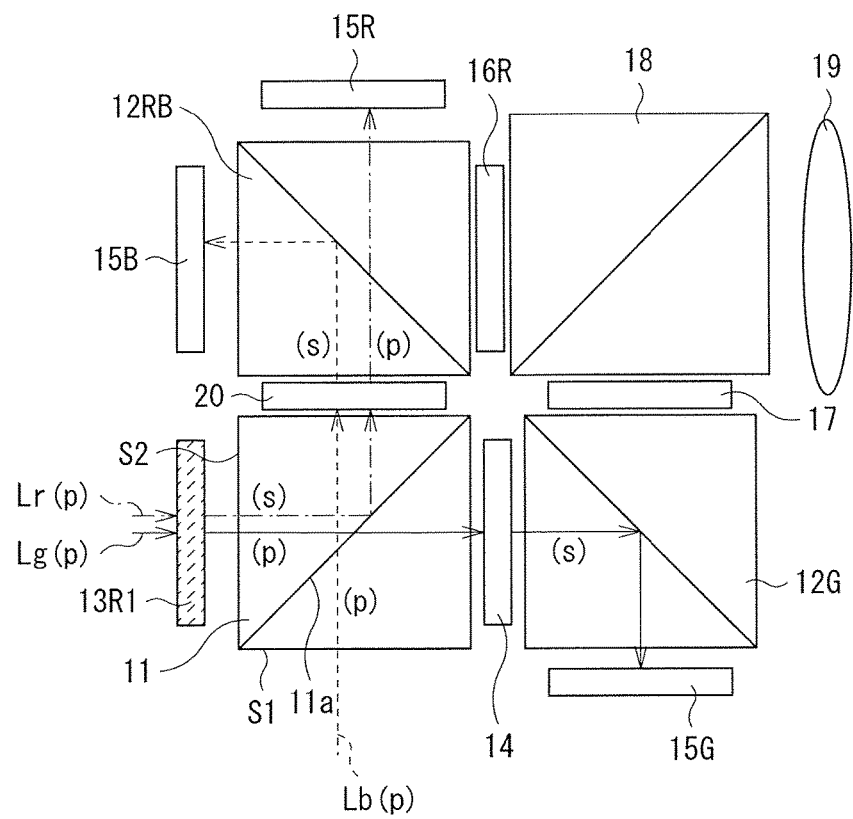

[ FIG. 12 ]
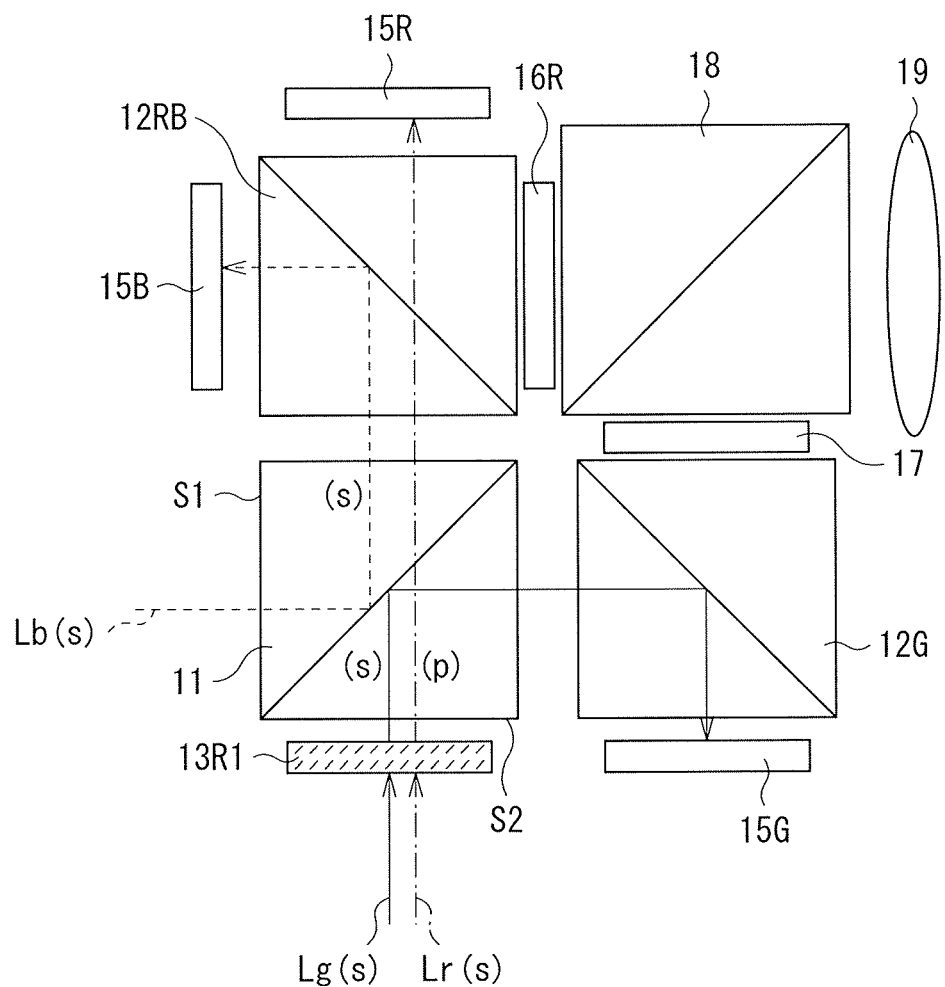

[ FIG. 13 ]
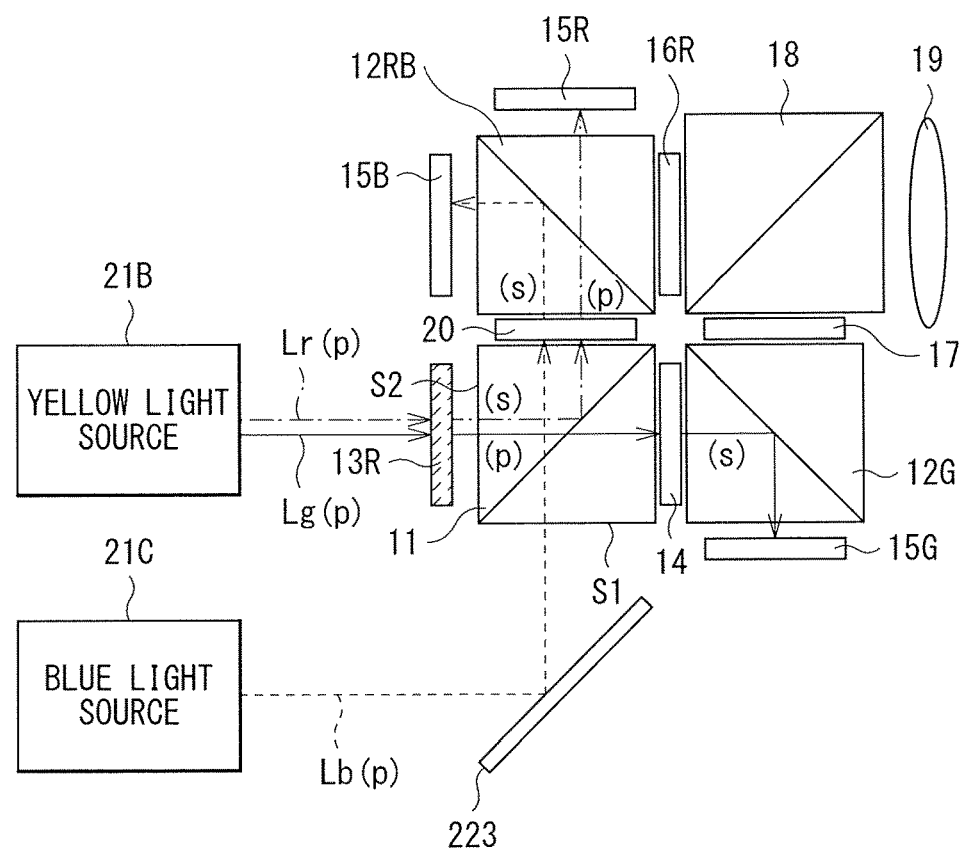

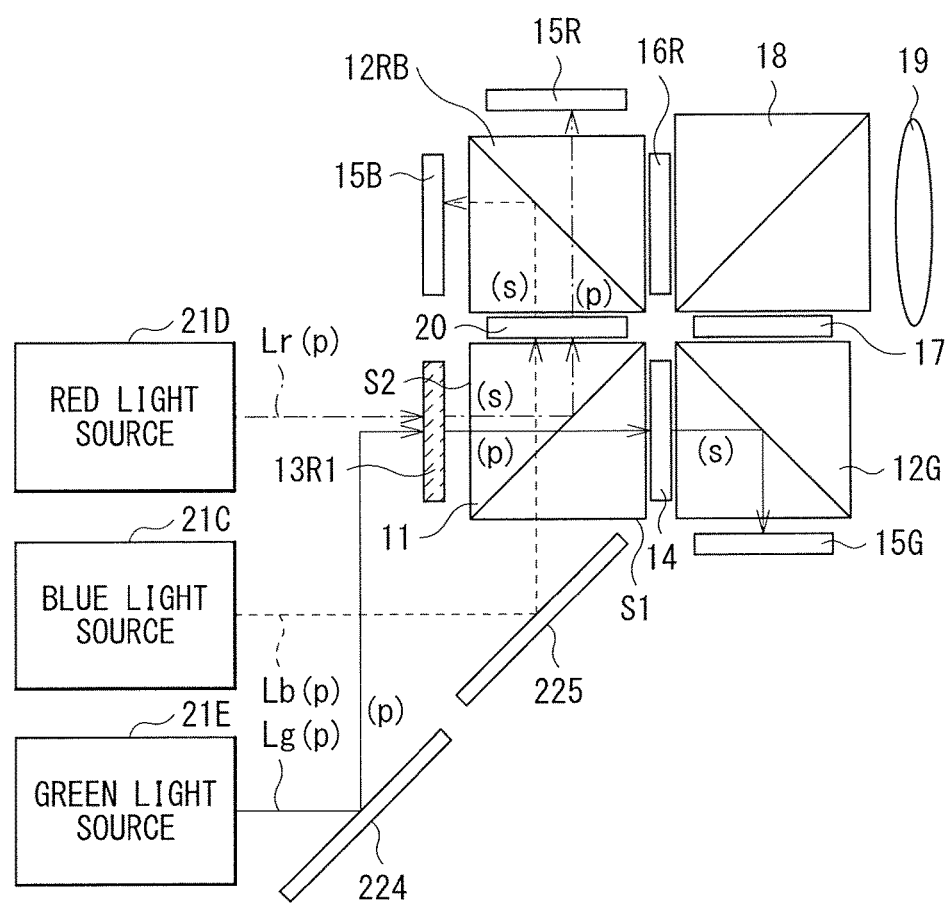
[ FIG. 14 ]

[ FIG. 15 ]
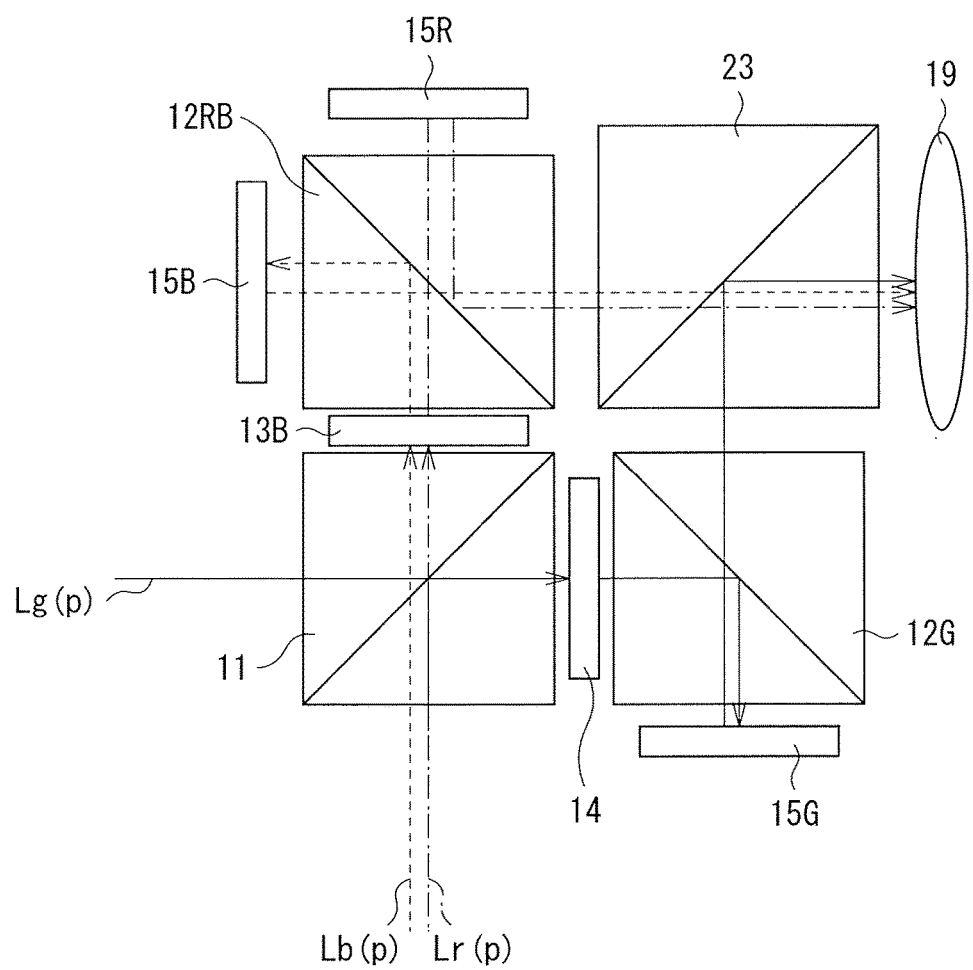

[ FIG. 16 ]
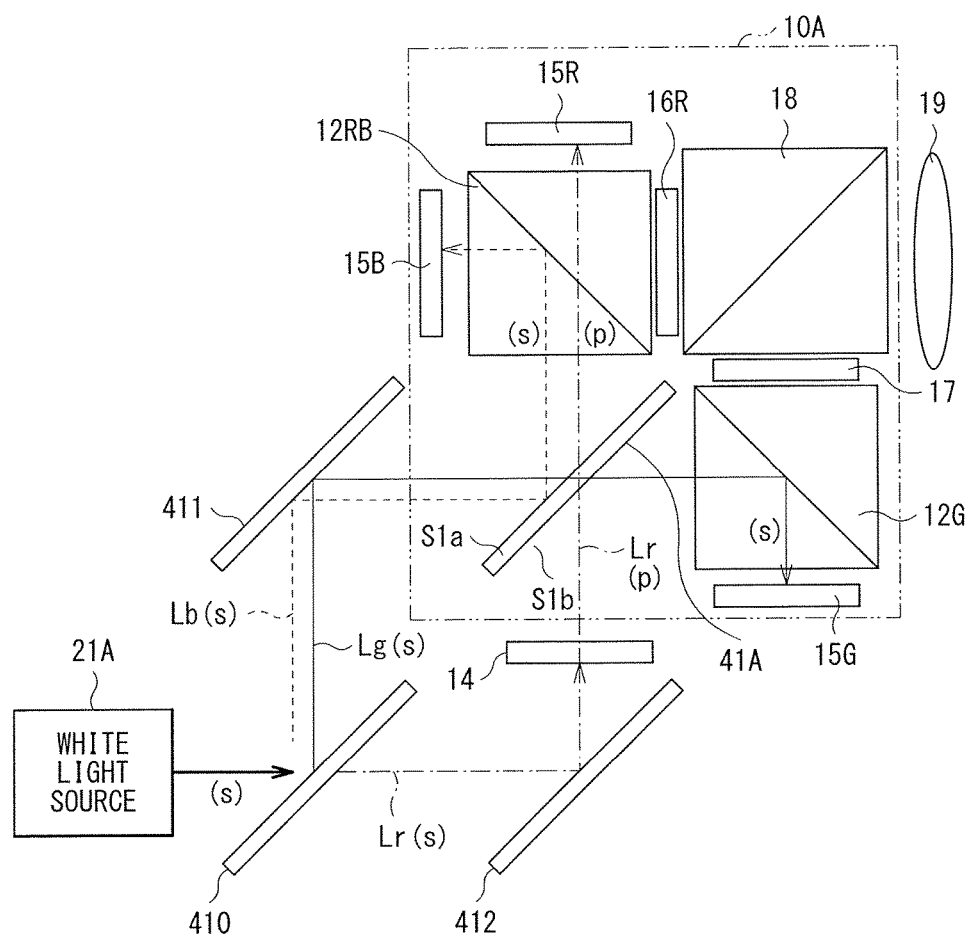

[ FIG. 17 ]
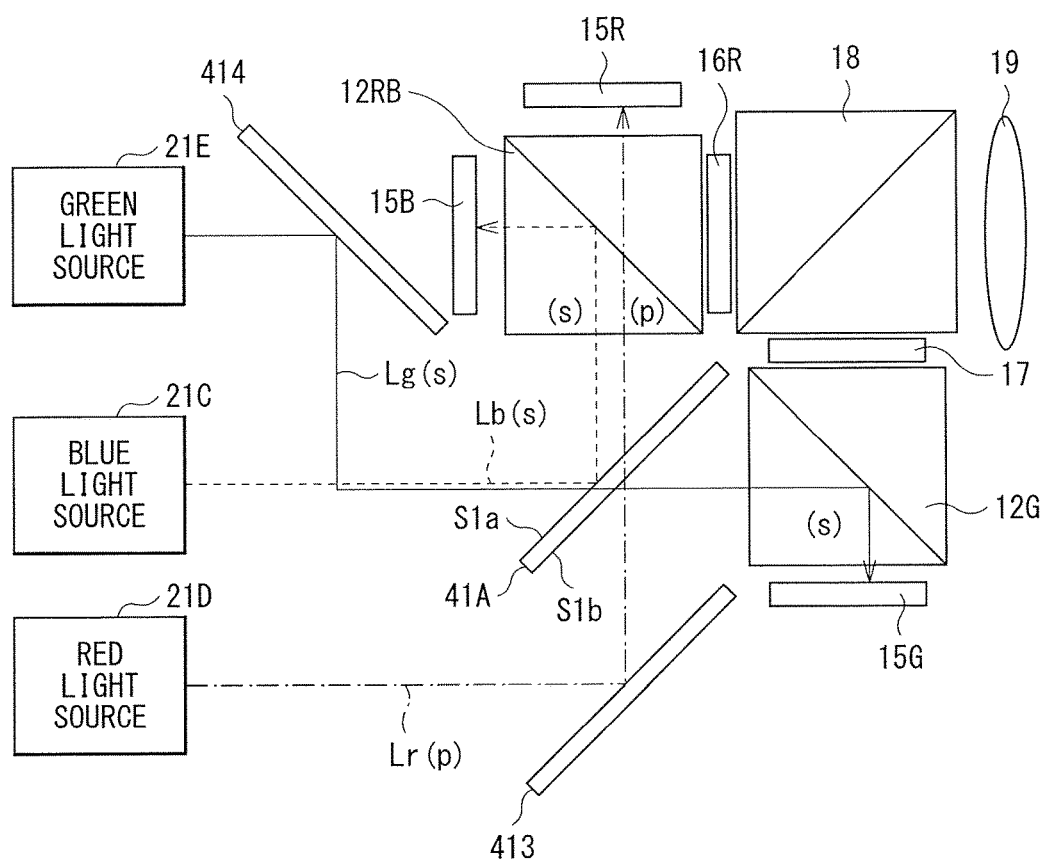

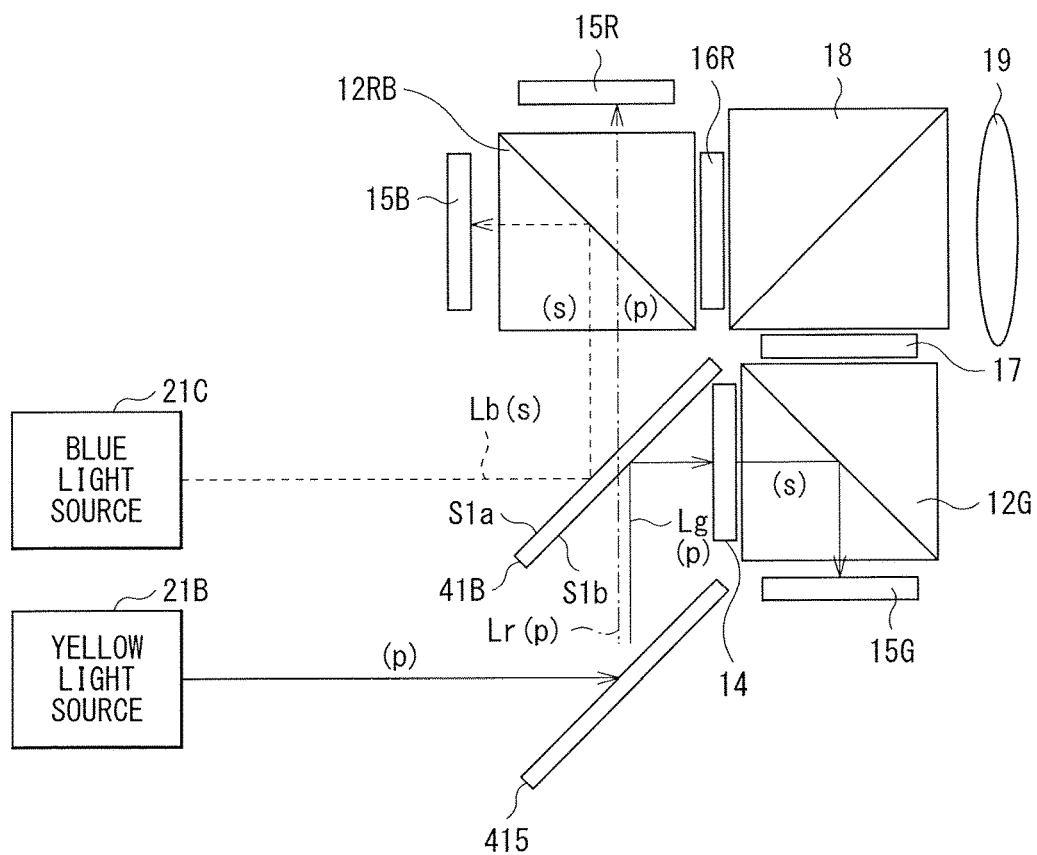
[ FIG. 18 ]

PROJECTION DISPLAY APPARATUS

CROSS REFERENCE TO RELATED APPLICATIONS

This application is a U.S. National Phase of International Patent Application No. PCT/JP2016/062092 filed on Apr. 15, 2016, which claims priority benefit of Japanese Patent Application No. JP 2015-093237 filed in the Japan Patent Office on Apr. 30, 2015. Each of the above-referenced applications is hereby incorporated herein by reference in its entirety.

TECHNICAL FIELD

The present disclosure relates to a projection display apparatus using, for example, a reflective light modulator.

BACKGROUND ART

Projectors (projection display apparatuses) using a reflective liquid crystal display element called LCOS (Liquid Crystal On Silicon) have high resolution. Hence, in recent years, such projectors have become widespread as large-screen display apparatuses. There have been proposed optical systems using the reflective liquid crystal display element and a polarizing beam splitter (PBS) (for example, refer to PTL 1 and PTL 2).

In the optical system disclosed in PTL 1, light is separated by color into light of the three primary colors R (red), G (green), and B (blue), and light of each of the primary colors is guided to a reflective liquid crystal display element corresponding to the color. A retardation film having wavelength selectivity (a wavelength selective retardation film) is used to separate light into the three primary colors. The wavelength selective retardation film is configured to selectively rotate a polarization direction of only light in a wavelength band corresponding to one of the three primary colors, for example, a red band. Light passes through such a wavelength selective retardation film, which causes the wavelength selective retardation film to selectively rotate only a polarization direction of light in the red band to output the light in the red band having a polarization direction different by 90 degrees from polarization directions of light in a green band and light in a blue band. Thereafter, the light passes through a PBS, which makes it possible to separate the light in the red band from the light in the green band and the light in the blue band.

In the optical system disclosed in PTL 2, light of each of the three primary colors is guided to a LCOS corresponding to the color. However, in order to separate light into the three primary colors, first, a dichroic mirror separates the light into combined light of red light and blue light, and green light. Thereafter, the wavelength selective retardation film is used to rotate polarization of only blue light derived from the combined light of red light and blue light, thereby allowing the PBS to separate the combined light of red light and blue light into red light traveling toward a LCOS for red and blue light traveling toward a LCOS for blue.

CITATION LIST

Patent Literature

PTL 1: Japanese Unexamined Patent Application Publication No. 2000-284228

PTL 2: Japanese Unexamined Patent Application Publication No. 2004-12864

SUMMARY OF THE INVENTION

However, using the wavelength selective retardation film that rotates a polarization direction of light in a narrow band as described above causes an issue that a contrast ratio in a projected image is decreased.

It is therefore desirable to provide a projection display apparatus that makes it possible to suppress a decrease in a contrast ratio in a projected image.

A first projection display apparatus according to an embodiment of the present disclosure includes: a color separator that has a first incident surface and a second incident surface, and allows light in first to third wavelength bands having entered the first and second incident surfaces to pass therethrough or reflects the light in the first to third wavelength bands; first to third reflective light modulators that respectively modulates the light in the first to third wavelength bands; a first polarization splitter that guides the light in the first wavelength band outputted from the color separator to the first reflective light modulator; a second polarization splitter that guides the light in the second wavelength band outputted from the color separator to the second reflective light modulator and guides the light in the third wavelength band outputted from the color separator to the third reflective light modulator; and a projection optical system that projects light in respective wavelength bands outputted from the first to third reflective light modulators. Light in at least one wavelength selected from the first to third wavelength bands enters the first incident surface of the color separator as first polarized light, and light in the other wavelength bands enters the second incident surface of the color separator as second polarized light orthogonal to the first polarized light.

In the first projection display apparatus according to the embodiment of the present disclosure, the light in at least one wavelength band selected from the first to third wavelength bands enters the first incident surface of the color separator as the first polarized light, and the light in the other wavelength bands enters the second incident surface of the color separator as second polarized light orthogonal to the first polarized light. This makes it possible to guide light in each of the first to third wavelength bands to corresponding one of the first to third reflective light modulators without using, for example, a retardation film (hereinafter referred to as "narrow band retardation film") that selectively rotates polarized light in a specific wavelength band selected from the first to third wavelength bands. Alternatively, this makes it possible to reduce the number of such narrow band retardation films. The light in the respective wavelength bands outputted from the first to third reflective light modulators is projected on a projection surface by the projection optical system.

A second projection display apparatus according to an embodiment of the present disclosure includes: a first polarization splitter that has a first incident surface and a second incident surface, and is disposed to allow light in one wavelength band selected from first to third wavelength bands to enter the first incident surface and to allow light in the other two wavelength bands selected from the first to third wavelength bands to enter the second incident surface; first to third reflective light modulators that respectively modulate light in the first to third wavelength bands; a second polarization splitter that guides light in the first wavelength band outputted from the first polarization splitter to the first reflective light modulator; a third polarization splitter that guides light in the second wavelength band outputted from the first polarization splitter to the second reflective light modulator and guides light in the third wavelength band outputted from the first polarization splitter to the third reflective light modulator; and a projection optical system that projects light in respective wavelength bands outputted from the first to third reflective light modulators.

In the second projection display apparatus according to the embodiment of the present disclosure, the first polarization splitter is disposed to allow the light in the one wavelength band to enter the first incident surface and to allow light in the other two wavelength bands to enter the second incident surface. This makes it possible to guide light in each of the first to third wavelength bands to corresponding one of the first to third reflective light modulators without using, for example, a retardation film (hereinafter referred to as "narrow band retardation film") that selectively rotates polarized light in a specific wavelength band selected from the first to third wavelength bands. Alternatively, this makes it possible to reduce the number of such narrow band retardation films. The light in the respective wavelength bands outputted from the first to third reflective light modulators is projected on a projection surface by the projection optical system.

According to the first projection display apparatus of the embodiment of the present disclosure, the light in at least one wavelength band selected from the first to third wavelength band enters the first incident surface of the color separator as the first polarized light, and the light in the other wavelength bands enters the second incident surface of the color separator as the second polarized light. This makes it possible to separate light into the light in the first to third wavelength bands without using the narrow band retardation film and guide light in each of the first to third wavelength bands to corresponding one of the first to third reflective light modulators. Alternatively, this makes it possible to reduce the number of narrow band retardation films. In the narrow band retardation film here, characteristic control is difficult; therefore, in actuality, a polarization direction of light in an unintentional wavelength band (that is, a wavelength band other than wavelength bands to be separated) is also rotated. As a result, light in a wavelength band different from a target wavelength band is leaked into each of reflective light modulators to decrease a contrast ratio in a projected image. Separating light into the light in the first to third wavelength bands without using such a narrow band retardation film or with the reduced number of narrow band retardation films makes it possible to suppress a decrease in the contrast ratio in the projection image.

According to the second projection display apparatus of the embodiment of the present disclosure, the first polarization splitter is disposed to allow the light in the one wavelength band to enter the first incident surface and to allow the light in the other two wavelength bands to enter the second incident surface. This makes it possible to separate light into the light in the first to third wavelength bands without using the narrow band retardation film and guide the light in each of the first to third wavelength bands to corresponding one of the first to third reflective light modulators. Alternatively, this makes it possible to reduce the number of narrow band retardation films. In the narrow band retardation film here, characteristic control is difficult; therefore, in actuality, a polarization direction of light in an unintentional wavelength band (that is, a wavelength band other than wavelength bands to be separated) is also rotated. As a result, light in a wavelength band different from a target wavelength band is leaked into each of reflective light modulators to decrease a contrast ratio in a projected image. Separating light into the light in the first to third wavelength bands without using such a narrow band retardation film or with the reduced number of narrow band retardation films makes it possible to suppress a decrease in the contrast ratio in the projection image.

It is to be noted that effects of the present technology are not necessarily limited to the effects described here, and may include any of effects that are described herein.

BRIEF DESCRIPTION OF THE DRAWINGS

FIG. 1 is a functional block diagram illustrating a configuration example of a projection display apparatus according to a first embodiment of the present disclosure.

FIG. 2 is a schematic view of a configuration of an optical unit in the projection display apparatus illustrated in FIG. 1.

FIG. 3 is a schematic view of a configuration of an optical unit in a projection display apparatus according to a comparative example.

FIG. 4 is a characteristic diagram illustrating an optical characteristic example of a narrow-band retardation film in the comparative example.

FIG. 5 is an enlarged view of part of a characteristic illustrated in FIG. 4.

FIG. 6 is a schematic view for description of workings of the optical unit according to the comparative example.

FIG. 7 is a schematic view for description of workings (during white display) of the optical unit illustrated in FIG. 2.

FIG. 8 is a schematic view for description of workings (during black display) of the optical unit illustrated in FIG. 2.

FIG. 9 is a schematic view of examples of a light source and the optical unit illustrated in FIG. 1.

FIG. 10 is a schematic view of a configuration of an optical unit in a projection display apparatus according to a modification example 1-1.

FIG. 11 is a schematic view of a configuration of an optical unit in a projection display apparatus according to a modification example 1-2.

FIG. 12 is a schematic view of a configuration of an optical unit in a projection display apparatus according to a modification example 1-3.

FIG. 13 is a schematic view of configuration examples of a light source and an optical unit in a projection display apparatus according to a modification example 1-4.

FIG. 14 is a schematic view of configuration examples of a light source and an optical unit in a projection display apparatus according to a modification example 1-5.

FIG. 15 is a schematic view of a configuration of an optical unit in a projection display apparatus according to a modification example 1-6.

FIG. 16 is a schematic view of a configuration of an optical unit in a projection display apparatus according to a second embodiment of the present disclosure.

FIG. 17 is a schematic view of a configuration of an optical unit in a projection display apparatus according to a modification example 2-1.

FIG. 18 is a schematic view of a configuration of an optical unit in a projection display apparatus according to a modification example 2-2.

MODES FOR CARRYING OUT THE INVENTION

Some embodiments of the present disclosure are described in detail below with reference to drawings. It is to be noted that description is given in the following order.
1. First Embodiment (An example of a projection display apparatus using a polarization splitter that is so disposed as to allow P-polarized light in a green band to enter a first surface and as to allow P-polarized light in a blue band and P-polarized light in a red band to a second surface)
2. Modification Example 1-1 (An example in a case where polarized light entering the polarization splitter is S-polarized light)
3. Modification Example 1-2 (An example in a case where P-polarized light in the blue band enters the first surface and P-polarized light in the green band and P-polarized light in the red band enter the second surface)
4. Modification Example 1-3 (An example in a case where S-polarized light in the blue band enters the first surface and S-polarized light in the green band and S-polarized light in the red band enter the second surface)
5. Modification Example 1-4 (An example in a case where a yellow light source and a blue light source are used)
6. Modification Example 1-5 (An example in a case where a red light source, a green light source, and a blue light source are used)
7. Modification Example 1-6 (An example in a case where a dichroic prism is used as a color synthesizer)
8. Second Embodiment (An example of a projection display apparatus that is so configured as to allow S-polarized light in the green band and S-polarized light in the blue band to enter the first surface of the color separator and as to allow P-polarized light in the red band to enter the second surface of the color separator)
9. Modification Example 2-1 (An example in a case where a red light source, a green light source, and a blue light source are used)
10. Modification Example 2-2 (An example in a case where a yellow light source and a blue light source are used)

First Embodiment

Configuration

FIG. 1 is a functional block diagram illustrating an entire configuration of a projection display apparatus (a projection display apparatus 1) according to a first embodiment of the present disclosure. The projection display apparatus 1 is, for example, a display apparatus that projects an image on a screen 110 (a projection surface). The projection display apparatus 1 is coupled to an unillustrated external image supplier via an I/F (interface), and performs projection on the screen 110 on the basis of an image signal inputted to the interface. Examples of the external image supplier include computers such as PCs and various kinds of image players. It is to be noted that a configuration of the projection display apparatus 1 described below is illustrative, and the projection display apparatus of the present disclosure is not limited to such a configuration.

The projection display apparatus 1 includes, for example, a light source driver 31, a light source device 21, an optical unit 10, a projection optical system 19, an image processor 34, a frame memory 35, a panel driver 36, a projection optical system driver 37, and a controller 30.

The light source driver 31 outputs a pulse signal for control of light emission timing of a light source provided in the light source device 21. The light source driver 31 includes, for example, a PWM setter, a PWM signal generator, a limiter, and other components that are not illustrated, and perform control on a light source driver of the light source device 21 and PWM control on a light source 11 on the basis of control by the controller 30, thereby turning on or off the light source 11 or adjusting luminance.

The light source device 21 include, for example, one or a plurality of light sources (to be described later) that emit light in first to third wavelength bands (for example, a red band, a green band, and a blue band) as polarized light. Each of the light sources includes, for example, a solid-state light source such as a laser diode (LD) or a light-emitting diode (LED), a polarization converter, and other components. The polarization converter converts light emitted from the solid-state light source into linearly polarized light. Note that in a case where the laser diode is used as the solid-state light source, emitted light is polarized light; therefore, the polarization converter may not be provided. It is to be noted that in the present embodiment, light in a wavelength band indicates light having an emission intensity peak in the wavelength band. For example, "light in the green band" indicates light having an emission intensity peak in the green band. Moreover, the "green band" in the present embodiment corresponds to a specific example of a "first wavelength band" in the present disclosure. The "blue band" corresponds to a specific example of a "second wavelength band" in the present disclosure. The "red band" corresponds to a specific example of a "third wavelength band" in the present disclosure. Further, the green band is, for example, a band including a part or the entirety of a range from 500 nm to 580 nm both inclusive. The blue band is, for example, a band including a part or the entirety of a range from 430 nm to 490 nm both inclusive. The red band is, for example, a band including a part or the entirety of a range from 590 nm to 630 nm both inclusive.

The light source device 21 include, for example, a light source driver and a current value setter, in addition to the foregoing light sources. The light source driver drives the light sources, and the current value setter sets a current value in a case where the light sources are driven. The light source driver generates a pulse current having a current value set by the current value setter in synchronization with a pulse signal inputted from the light source driver 31 on the basis of power supplied from an unillustrated power source circuit. The generated pulse current is supplied to the light sources. Moreover, a technique of controlling light emission by PWM driving is described here as an example; however, a technique of driving the light source is not limited to the PWM driving, and any other technique (for example, a technique of controlling a light emission amount by modulation of a peak current value) may be adopted.

The optical unit 10 modulates each of light of R, light of G, light of B derived from light (illumination light) outputted from the light source device 21 and combine the modulated light of R, the modulated light of G, and the modulated light of B on the basis of the image signal to generate image light. The optical unit 10 includes, for example, three reflective light modulators corresponding to respective RGB colors. The three reflective light modulators are, for example, a reflective light crystal panel that modulates light in the blue (B) band, a reflective liquid crystal panel that modulates light in the red (R) band, and a reflective liquid crystal panel that modulates light in the green (G) band. As the reflective liquid crystal panels, for example, liquid crystal elements such as LCOS (Liquid Crystal On Silicon) may be used. In the optical unit 10, the modulated color light of R, the modulated color light of G, and the modulated color light of B are combined by a color synthesizer (a color synthesizer 18) to be described later, and thus-combined light is guided to the projection optical system 19. A specific configuration of the optical unit 10 is described later.

The projection optical system 19 includes a lens group and other components. The lens group projects light modulated by the optical unit 10 on the screen 110 to form an image.

The image processor 34 acquires the image signal inputted from outside, and performs determination such as determination of an image size, determination of resolution, and determination of a still image or a moving image. In a case with the moving image, the image processor 34 also determines, for example, an image data attribute such as a frame rate. Moreover, in a case where the resolution of the acquired image signal is different from display resolution of each of the liquid crystal panels of the optical unit 10, the image processor 34 performs resolution conversion. The image processor 34 develops the image having been subjected to these processes in the frame memory 35 for each frame, and outputs, to the panel driver 36, the image developed in the frame memory 35 for each frame as a display signal.

The panel driver 36 drives reflective liquid crystal panels (light modulators 15R, 15G, and 15B to be described later) in the optical unit 10. The panel driver 36 drives each of the liquid crystal panels to change transmittance of light through each of pixels provided in each of the liquid crystal panels, thereby forming an image.

The projection optical system driver 37 includes a motor that drives a lens provided in the projection optical system 19. The projection optical system driver 37 drives, for example, the projection optical system 19 in accordance with control by the controller 30 to perform adjustment such as zoom adjustment, focus adjustment, and diaphragm adjustment.

The controller 30 controls the light source driver 31, the image processor 34, the panel driver 36, and the projection optical system driver 37.

(Optical Unit 10)

FIG. 2 illustrates the configuration of the optical unit 10 together with the projection optical system 19. The optical unit 10 includes, for example, a polarization splitter 11, a polarization splitter 12G, a polarization splitter 12RB, a wavelength selective retardation film 13B, a retardation film 14, the light modulators 15G, 15B, and 15R, a wavelength selective retardation film 16R, a retardation film 17, and the color synthesizer 18. The optical unit 10 is so configured as to allow light emitted from the light source device 21 to enter the optical unit 10 from different directions (along two optical axes Z1 and Z2). It is to be noted that the polarization splitter 11 in the present embodiment corresponds to a specific example of a "first polarization splitter" of a second projection display apparatus of the present disclosure. The polarization splitter 12G corresponds to a specific example of a "second polarization splitter" of the second projection display apparatus of the present disclosure. The polarization splitter 12RB corresponds to a specific example of a "third polarization splitter" of the second projection display apparatus of the present disclosure.

The polarization splitter 11 includes, for example, a polarizing beam splitter, and includes an optical functional film 11a (an optical surface) and prisms 11B1 and 11B2 that are bonded together with the optical functional film 11a. The optical functional film 11a reflects incident light or allows the incident light to pass therethrough by each component of the incident light. The polarization splitter 11 has, for example, two incident surfaces S1 and S2, and is so disposed as to allow light in one or two wavelength bands to enter the incident surfaces S1 and S2 along the optical axes Z1 and Z2. Specifically, light in one wavelength band (for example, the green band) enters the incident surface S1, and light in the other two wavelength bands (for example, the red band and the blue band) enters the incident surface S2. The polarization splitter 12G and the polarization splitter 12RB are disposed in an optical path of outputted light from the polarization splitter 11 (light having passed through the optical functional film 11a and light reflected by the optical functional film 11a).

Note that the polarization splitter 11 is not limited to such a polarizing beam splitter, and may be any other optical element as long as the polarization splitter 11 is an element that allows for separation into polarized components. For example, a wire grid polarizer may be used in place of the polarizing beam splitter.

The polarization splitters 12G and 12RB each guide, for example, light in each of wavelength bands corresponding to the respective three primary colors to corresponding one of the light modulators 15G, 15R, and 15B, and guide modulated light in each of the wavelength bands to the color synthesizer 18. Each of the polarization splitters 12RB and 12G is configured of, for example, a polarizing beam splitter, as with the foregoing polarization splitter 11.

The polarization splitter 12G is so configured as to guide, for example, light in the green band to the light modulator 15G and output the light in the green band modulated by the light modulator 15G to the color synthesizer 18. The retardation film 14 is disposed in an optical path between the polarization splitter 12G and the polarization splitter 11, and the retardation film 17 is disposed in an optical path between the polarization splitter 12G and the color synthesizer 18.

Each of the retardation films 14 and 17 is an element that rotates a polarization direction of incident light. Each of the retardation films 14 and 17 here is configured of a half-wave plate that rotates the polarization direction by 90 degrees.

The polarization splitter 12RB guides, for example, light in the red band and light in the blue band to the light modulator 15R and the light modulator 15B, respectively, and guides the modulated light in the red band and the modulated light in the blue band to the color synthesizer 18. The wavelength selective retardation film 13B is disposed in an optical path between the polarization splitter 11 and the polarization splitter 12RB. The wavelength selective retardation film 16R is disposed between the polarization splitter 12RB and the color synthesizer 18.

The wavelength selective retardation film 13B is a retardation film having a characteristic that the retardation film rotates a polarization direction only in a selective wavelength band. In the present embodiment, the wavelength selective retardation film 13B is configured to selectively rotate the polarization direction of the light in the blue band selected from the red band and the blue band (and is configured to allow the light in the red band to pass therethrough while maintaining the polarization direction thereof). It is only necessary to design the wavelength selective retardation film 13B in consideration of only performance in at least two wavelength bands (the red band and the blue band here), and it is not necessary to consider all of the wavelengths of RGB (characteristics in the green band are optional).

The wavelength selective retardation film 16R is a retardation film having a characteristic that the retardation film rotates a polarization direction only in a selective wavelength band. The wavelength selective retardation film 16R here is configured to selectively rotate the polarization direction of the light in the red band selected from the red band and the blue band (and is configured to allow the light in the blue band to pass therethrough while maintaining the polarization direction thereof). As with the foregoing wavelength selective retardation film 13B, it is only necessary to design the wavelength selective retardation film 16R in consideration of only performance in at least two wavelength bands (the red band and the blue band here), and it is not necessary to consider all of the wavelengths of RGB.

The color synthesizer 18 is an element that performs synthesis (color synthesis) of light in the respective wavelength bands outputted from the light modulators 15R, 15G, and 15B and guides thus-synthesized light to the projection optical system 19. The color synthesizer 18 is configured of, for example, a polarizing beam splitter. In the configuration of the present embodiment, light outputted from the light modulator 15G enters the color synthesizer 18 via the polarization splitter 12G and the retardation film 17 from one direction, and light outputted from the light modulators 15R and 15B enters the color synthesizer 18 via the polarization splitter 12RB and the wavelength selective retardation film 16R from a direction different from the one direction.

[Workings and Effects]

In the projection display apparatus 1 according to the present embodiment, the light source device 21 is driven, the light in the red band, the light in the green band, and the light in the blue band (each of which is linearly polarized light) are emitted from the respective light sources, and thereafter, the light in the green band (the first wavelength band) selected from the light in the red band, the light in the green band, and the light in the blue band enters the incident surface S1 (the first incident surface) of the polarization splitter 11. In contrast, the light in the red band and the light in the green band (the second band and the third wavelength band) enter the incident surface S2 (the second incident surface) of the polarization splitter 11. The light in the green band (hereinafter referred to as green light) is outputted from the polarization splitter 11, and thereafter, the green light enters the light modulator 15G via the retardation film 14 and the polarization splitter 12G and is modulated by the light modulator 15G. The light in the red band (hereinafter referred to as red light) and the light in the blue band (hereinafter referred to as blue light) are outputted from the polarization splitter 11, and thereafter, the red light and the blue light enter the light modulators 15R and 15B via the wavelength selective retardation film 13B and the polarization splitter 12RB, and are modulated by the light modulators 15R and 15B.

The modulated light in the respective wavelength bands is outputted toward the color synthesizer 18 via the polarization splitters 12G and 12RB. The modulated light in the green band enters the color synthesizer 18 via the polarization splitter 12G and the retardation film 17. The modulated light in the red band and the modulated light in the blue band enter the color synthesizer 18 via the polarization splitter 12RB and the wavelength selective retardation film 16R. In the color synthesizer 18, the modulated light in the respective wavelength bands are synthesized, and thus-synthesized light is guided to the projection optical system 19. The projection optical system 19 performs display, for example, by projecting the synthesized light on the screen 110 in a magnified form.

Comparative Example

Here, FIG. 3 illustrates a configuration of an optical unit (an optical unit 100) according to a comparative example of the present embodiment. The optical unit 100 of the comparative example includes polarization splitters 101, 102G, and 102RG such as polarizing beam splitters, and a color synthesizer 108, as with the present embodiment. Moreover, a retardation film 104 (a half-wave plate) is disposed between the polarization splitter 101 and the polarization splitter 102G, and a retardation film 107 (a half-wave plate) is disposed between the polarization splitter 102G and the color synthesizer 108. Further, a wavelength selective retardation film 103R is disposed between the polarization splitter 101 and the polarization splitter 102RB, and a wavelength selective retardation film 106R is disposed between the polarization splitter 102RB and the color synthesizer 108. Note that, in the configuration of the comparative example, the polarization splitter 101 has only one incident surface (S100), and all the light in the wavelength bands of RGB enters the incident surface S100. Moreover, a narrow band retardation film 101G is disposed between the incident surface S100 of the polarization splitter 101 and a light source (not illustrated in FIG. 3).

The narrow band retardation film 101G is a retardation film having a characteristic that the retardation film rotates a polarization direction only in a selective wavelength band, as with the wavelength selective retardation film 13B in the foregoing embodiment. Specifically, the narrow band retardation film 101G is configured to selectively rotate the polarization directions of the light in the red band and the light in the blue band selected from the light in the red band, the light in the green band, and the light in the blue band (and is configured to allow the light in the green band to pass therethrough while maintaining the polarization direction thereof). In other words, it is desired to control the characteristics in all of three wavelength bands of RGB in the narrow band retardation film 101G.

In the optical unit 100, light Lr(p) in the red band, light Lg(p) in the green band, and light Lb(p) in the blue band emitted from a light source pass through the narrow band retardation film 101G before entering the polarization splitter 101. It is to be noted that in the present specification, for the sake of description, polarized light (a polarized component) passing through the optical functional film 101a (an optical surface) of the polarization splitter 101 is referred to as "p-polarized light". Moreover, polarized light (a polarized component) reflected by the optical functional film 101a (the optical surface) of the polarization splitter 101 is referred to as "s-polarized light". In the comparative example, each of the light Lr(p), the light Lg(p), and the light Lb(p) that enters the optical unit 100 is p-polarized light.

The light Lr(p), the light Lg(p), and the light Lb(p) pass through the narrow band retardation film 101G, which causes the narrow band retardation film 101G to selectively rotate polarization directions of the light Lr(p) in the red band and the light Lb(p) in the blue band (to convert the light Lr(p) in the red band and the light Lb(p) in the blue band into s-polarized light). In contrast, the narrow band retardation film 101G outputs the light Lg(p) in the green band remaining as p-polarized light.

The light Lg(p) in the green band passes through the optical functional film 101a of the polarization splitter 101. Thereafter, the light Lg(p) in the green band is converted into s-polarized light in the retardation film 104, and the s-polarized light enters the polarization splitter 102G. The s-polarized light is reflected by the polarization splitter 102G to enter the light modulator 105G. The light in the green band modulated by the light modulator 105G is outputted from the light modulator 105G as p-polarized light, and thereby passes through the optical surface of the polarization splitter 102G. The p-polarized light in the green band outputted from the polarization splitter 102G is converted into s-polarized light in the retardation film 107, and thereafter, the s-polarized light enters the color synthesizer 108.

Each of the light Lr(p) in the red band and the light Lb(p) in the blue band passes through the narrow band retardation film 101G to be converted into s-polarized light, and the s-polarized light is reflected by the optical functional film 101a of the polarization splitter 101 to be outputted. Thereafter, the s-polarized light enters the wavelength selective retardation film 103R, and the wavelength selective retardation film 103R selectively rotates the polarization direction of the light in the red band, and outputs the light in the red band. In other words, the light in the blue band enters the polarization splitter 102RB as s-polarized light, and the light in the red band enters the polarization splitter 102RB as p-polarized light. Hence, the light in the red band and the light in the blue band are separated on the optical surface of the polarization splitter 102RB, and respectively enter the corresponding light modulators 105R and 105B. The light in the red band modulated by the light modulator 105R is outputted as s-polarized light, and the light in the blue band modulated by the light modulator 105B is outputted as p-polarized light. Hence, the modulated light in the red band and the modulated light in the blue band are combined on the optical surface of the polarization splitter 102RB, and the combined light is outputted from the polarization splitter 102RB. The s-polarized light in the red band and the p-polarized light in the blue band outputted from the polarization splitter 102RB pass through the wavelength selective retardation film 106R, and the polarization direction of the light in the red band is thereby selectively rotated (the light in the red band is converted into p-polarized light). In other words, each of the light in the red band and the light in the blue band enters the color synthesizer 108 as p-polarized light.

In the color synthesizer 108, the light in the red band and the light in the blue band having entered the color synthesizer 108 as p-polarized light and the light in the green band having entered the color synthesizer 108 as s-polarized light are synthesized, and thus-synthesized light is outputted to a projection optical system 109.

As described above, in the optical unit 100 in the comparative example, light emitted from the light source is separated into the three primary colors, and light of each of the three primary colors is guided to corresponding one of the light modulators 105R, 105G, and 105B, and the narrow band retardation film 101G is disposed in an optical path of the light. The narrow band retardation film 101G ideally performs polarization rotation (polarization conversion) on only light in a specific wavelength band and does not perform polarization rotation on light in the other wavelength bands.

However, in actuality, the polarization direction of light in the entirety of a visible band including not only the red band and the blue band but also the green band is rotated, as illustrated in FIG. 4. FIG. 4 illustrates an example of characteristics of the narrow band retardation film 101G. FIG. 5 is an enlarged view of a region in which a polarization conversion ratio is 10% or less. In the narrow band retardation film 101G in the comparative example, it is desired to control the characteristics in all of the wavelength bands of the primary colors RGB; however, such control is difficult as illustrated in the drawings. It is difficult to design a polarization conversion ratio in the green band to be perfectly 0%, and in actuality, polarization of light in the green band is slightly converted.

As a result, the light Lg(p) in the green band emitted from the light source passes through the narrow band retardation film 101G, and the narrow band retardation film 101G outputs not only p-polarized light but also s-polarized light in a mixed manner, as illustrated in FIG. 6. Accordingly, a part of the light in the green band is unintentionally reflected by the optical functional film 101a, and passes through the wavelength selective retardation film 103R to be leaked into the polarization splitter 102RB. The light in the green band is leaked into the red light modulator 105R or the blue light modulator 105B, which causes a decrease in a contrast ratio in a projected image.

In contrast, in the present embodiment, the polarization splitter 11 has two incident surfaces S1 and S2, and is so disposed as to allow light in one wavelength band (for example, the green band) to enter the incident surface S1 and as to allow light in the other two wavelength bands (for example, the red band and the blue band) to enter the incident surface S2. This makes it possible to separate light into light in the wavelength bands of RGB without using the retardation film (the narrow band retardation film 101G), as in the comparative example, that selectively rotates polarized light in a specific wavelength band selected from the wavelength bands of RGB and thereafter guide light in each of the wavelength bands to corresponding one of the light modulators 15R, 15G, and 15B. Alternatively, this makes it possible to reduce the number of such narrow band retardation films.

Specifically, the light Lg(p) in the green band emitted from the light source enters the polarization splitter 11 from the incident surface S1, and passes through the optical functional film 11a, and thereafter, the light Lg(p) in the green band is converted into s-polarized light in the retardation film 14, and the s-polarized light enters the polarization splitter 12G, as illustrated in FIG. 7. The s-polarized light is reflected by the optical surface of the polarization splitter 12G to enter the light modulator 15G, and the s-polarized light is modulated by the light modulator 15G. The light in the green band modulated by the light modulator 15G is outputted as p-polarized light from the light modulator 15G. Hence, the light in the green band passes through the optical surface of the polarization splitter 12G. The light (p-polarized light) in the green band outputted from the polarization splitter 12G is converted into s-polarized light in the retardation film 17, and thereafter the s-polarized light enters the color synthesizer 18.

In contrast, the light Lr(p) in the red band and the light Lb(p) in the blue band enter the polarization splitter 11 from the incident surface S2, and pass through the optical functional film 11a to be outputted to a direction different from a direction where the light in the green band is outputted. Thereafter, the light Lr(p) in the red band and the light Lb(p) in the blue band enter the wavelength selective retardation film 13B, and the wavelength selective retardation film 13B selectively rotates the polarization direction of the light in the blue band, and outputs the light in the red band and the light in the blue band. In other words, the light in the blue band enters the polarization splitter 12RB as s-polarized light, and the light in the red band enters the polarization splitter 12RB as p-polarized light. Accordingly, the light in the red band the light in the blue band are separated on the optical surface of the polarization splitter 12RB to enter the corresponding light modulators 15R and 15B, respectively. The light in the red band modulated by the light modulator 15R is outputted as s-polarized light, and the light in the blue band modulated by the light modulator 15B is outputted as p-polarized light. The modulated light in the red band and the modulated light in the blue band are combined on the optical surface of the polarization splitter 12RB, and thus-combined light is outputted from the polarization splitter 12RB. The s-polarized light in the red band and the p-polarized light in the blue band outputted from the polarization splitter 12RB pass through the wavelength selective retardation film 16R, and the polarization direction of the light in the red band is thereby selectively rotated (the light in the red band is converted into p-polarized light). In other words, each of the light in the red band and the light in the blue band enters the color synthesizer 18 as p-polarized light.

It is to be noted that operation in a case where the projection display apparatus 1 is in an on state is described above. In a case where the projection display apparatus 1 is in an off state, light is not modulated in any of the light modulators 15R, 15G, and 15B, as illustrated in FIG. 8, and the polarization direction of the light is not rotated. Accordingly, light in each of the wavelength bands is not outputted from each of the polarization splitters 12G and 12RB to the projection lens, and is turned to an off state. Moreover, in the present specification, for the sake of description, first polarized light (a polarized component) passing through the optical functional film 11a (the optical surface) of the polarization splitter 11 is referred to as "p-polarized light". Moreover, polarized light having a polarization direction rotated by 90° from the polarization direction of the first polarized light, that is, second polarized light (a polarized component) reflected by the optical functional film 11a (the optical surface) of the polarization splitter 101 is referred to as "s-polarized light". In the present embodiment, light in each of the wavelength bands of RGB outputted from the light source is p-polarized light.

Thus, in the configuration of the present embodiment, light in three wavelength bands of RGB does not pass through one wavelength selective retardation film. In other words, it is possible to design the wavelength selective retardation film 13B without considering characteristics of the green band (it is only necessary to control characteristics of at least two wavelength bands, i.e., the red band and the blue band). Accordingly, as compared with a case where the narrow band retardation film 101G of the comparative example is used, optical design is easy. Moreover, it is possible to decrease polarization conversion deviating from ideal polarization conversion and to suppress leakage of the light in the green band into the red light modulator 15R and the blue light modulator 15B. It is possible to perform color separation and guide each color light to corresponding one of the light modulators 15R, 15G, and 15B without using the narrow band retardation film in which characteristic control is difficult.

As described above, in the present embodiment, the polarization splitter 11 has two incident surfaces S1 and S2, and is so disposed as to allow light in one wavelength band (for example, the green band) to enter the incident surface S1 and as to allow light in the other two wavelength bands (for example, the red band and the blue band) to enter the incident surface S2. This makes it possible to separate light into light in the respective wavelength bands of RGB and guide the light in each of the wavelength bands of RGB to corresponding one of the light modulators 15R, 15G, and 15B without using the retardation film (the narrow band retardation film 101G) in which characteristic control is difficult as in the comparative example. Alternatively, this makes it possible to decrease the number of such narrow band retardation films. Accordingly, it is possible to suppress a decrease in the contrast ratio in the projected image.

Moreover, in the present embodiment, lengths of optical paths from the incident surfaces S1 and S2 of the polarization splitter 11 to the light modulators 15R, 15G, and 15B are substantially equal. Accordingly, in-plane intensity distributions of incident light in the light modulators 15R, 15G, and 15B are the same or nearly the same in RGB. This makes it possible to improve luminance uniformity in the projected image.

Further, in the present embodiment, as described above, light in the wavelength bands of RGB is emitted as polarized light from the light source to pass through the polarization splitter 11, thereby entering the polarization splitter 12G and the polarization splitter 12RB. Here, it is considered that in place of the polarization splitter 11, a dichroic mirror or a dichroic prism is used to perform color separation, and each color light is directed to the polarization splitters 12G and 12RB. However, it is known that in a case where the dichroic mirror or the dichroic prism is used, a polarization direction of light passing therethrough or reflected thereby is rotated. Rotating the polarization direction causes an unnecessary polarized component to enter the polarization splitters 12G and 12RB, which results in a decrease in the contrast ratio. Hence, it is more desirable to use the polarization splitter 11 than to use the dichroic mirror or the dichroic prism in terms of enhancement of the contrast ratio.

In the foregoing projection display apparatus 1, for example, it is possible to use a white light source 21A as illustrated in FIG. 9 as the light source in the light source device 21. In this example, light Lw(p) emitted as p-polarized light from the white light source 21A is subjected to color separation by a color separator 220 such as a dichroic mirror, and thereafter is subjected to optical path conversion through optical path converters 221 and 222. Thus, the light Lg(p) enters the incident surface S1 of the polarization splitter 11, and the light Lr(p) and the light Lb(p) enter the incident surface S2 of the polarization splitter 11.

Next, description is given of modification examples of the foregoing embodiment and other embodiments. In the following, substantially same components as those in the foregoing embodiment are denoted with same reference numerals, and any redundant description thereof is omitted.

Modification Example 1-1

FIG. 10 illustrates a configuration example of an optical unit according to a modification example 1-1. The foregoing embodiment involves an example in which light in the respective wavelength bands enters the incident surfaces S1 and S2 of the polarization splitter 11 as p-polarized light; however, light entering the polarization splitter 11 may be s-polarized light. For example, as with the configuration of the modification example, light Lg(s) in the green band may enter the incident surface S1 of the polarization splitter 11 and light Lr(s) in the red band and light Lb(s) in the blue band may enter the incident surface S2 of the polarization splitter 11.

In the modification example, each of the light Lr(s) in the red band, the light Lg(s) in the green band, and the light Lb(s) in the blue band is emitted as s-polarized light from the light source. Moreover, a retardation film (corresponding to the retardation film 14 in the foregoing embodiment) is unnecessary between the polarization splitter 11 and the polarization splitter 12G. A wavelength selective retardation film 13R is disposed between the polarization splitter 11 and the polarization splitter 12RB. The wavelength selective retardation film 13R is a retardation film having a characteristic that the retardation film rotates a polarization direction only in a selective wavelength band, as with the wavelength selective retardation film 13B in the foregoing embodiment. The wavelength selective retardation film 13R in the modification example is configured to selectively rotate the polarization direction of light in the red band selected from the red band and the blue band (and is configured to allow the light in the blue band to pass therethrough while maintaining the polarization direction thereof). It is only necessary to design the wavelength selective retardation film 13R in consideration of only performance in at least two wavelength bands (the red band and the blue band here), and it is not necessary to consider all of the wavelengths of RGB (characteristics in the green band are optional).

Thus, light entering the polarization splitter 11 may be s-polarized light. Even in such a case, as with the foregoing embodiment, it is possible to perform color separation and guide light in each of the wavelength bands to corresponding one of the light modulators 15R, 15G, and 15B without using the narrow band retardation film in which characteristic control in three wavelength bands of RGB is necessary as in the comparative example. Moreover, optical design of the wavelength selective retardation film 13R is easy. This makes it possible to suppress leakage of the light in the green band into the light modulators 15R and 15B. Accordingly, effects similar to those in the foregoing embodiment are achievable.

Moreover, in the modification example, a retardation film is not necessary between the polarization splitters 11 and 12G, which makes it possible to reduce the number of components.

Modification Example 1-2

FIG. 11 illustrates a configuration example of an optical unit according to a modification example 1-2. In the foregoing embodiment, the light in the green band enters the incident surface S1 of the polarization splitter 11, and the light in the red band and the light in the blue band enter the incident surface S2 of the polarization splitter 11; however, a combination of light in the wavelength bands entering the incident surfaces S1 and S2 is not limited thereto. For example, as with the modification example, the light in the blue band may enter the incident surface S1, and the light in the green band and the light in the red band may enter the incident surface S2.

In the modification example, each of the light Lr(p) in the red band, the light Lg(p) in the green band, and the light Lb(p) in the blue band is emitted as p-polarized light from the light source. Moreover, a wavelength selective retardation film 13R1 is disposed between the incident surface S2 of the polarization splitter 11 and the light source. The wavelength selective retardation film 13R1 is a retardation film having a characteristic that the retardation film rotates a polarization direction only in a selective wavelength band, as with the wavelength selective retardation film 13B in the foregoing embodiment. The wavelength selective retardation film 13R1 is configured to selectively rotate the polarization direction of light in the red band selected from the red band and the green band (and is configured to allow the light in the green band to pass therethrough while maintaining the polarization direction thereof). It is only necessary to design the wavelength selective retardation film 13R1 in consideration of only performance in at least two wavelength bands (the red band and the green band here), and it is not necessary to consider all of the wavelengths of RGB (a characteristics in the blue band are optional). Moreover, a retardation film 20 not having wavelength selectivity may be disposed between the polarization splitter 11 and the polarization splitter 12RB. The retardation film 20 is, for example, a half-wave plate, as with the retardation films 14 and 17 in the foregoing embodiment.

In the modification example, in the foregoing configuration, the light Lb(p) in the blue band emitted from the light source enters the incident surface S1 as p-polarized light. The light in the blue band passes through the optical functional film 11a to be outputted from the polarization splitter 11. Thereafter, the light in the blue band is converted into s-polarized light in the retardation film 20, and the s-polarized light enters the polarization splitter 12RB. In contrast, the light Lg(p) in the green band and the light Lr(p) in the red band enter the wavelength selective retardation film 13R1. The wavelength selective retardation film 13R1 selectively rotates the polarization direction of the light in the red band, and outputs the light in the red band as s-polarized light (and outputs the light in the green band remaining as p-polarized light). Thus, the light in the red band enters the incident surface S2 of the polarization splitter 11 as s-polarized light, and the light in the green band enters the incident surface S2 of the polarization splitter 11 as p-polarized light. Accordingly, the light in the green band passes through the optical functional film 11a to be outputted from the polarization splitter 11. Thereafter the light in the green band is converted into s-polarized light in the retardation film 14, and the s-polarized light enters the polarization splitter 12G. The light in the red band is reflected by the optical functional film 11a to be outputted from the polarization splitter 11. Thereafter, the light in the red band is converted into p-polarized light in the retardation film 20, and the p-polarized light enters the polarization splitter 12RB.

Thus, even in the modification example, as with the foregoing embodiment, it is possible to perform color separation and guide light in each of the wavelength bands to corresponding one of the light modulators 15R, 15G, and 15B without using the narrow band retardation film as in the comparative example. Moreover, optical design of the wavelength selective retardation film 13R1 is easy. This makes it possible to suppress leakage of the light in the green band into the light modulators 15R and 15B. Accordingly, effects similar to those in the foregoing embodiment are achievable.

Moreover, in the modification example, an optical path of the light Lb(p) in the blue band and an optical path of the light Lr(p) in the red band and the light Lg(p) in the green band are different from each other. This allows for a suitable layout for cases such as a case where a laser diode is used for the light source that emits light in the blue band, and a yellow phosphor (YAG) light source is used for the light source that emits light in the red band and light in the green band.

Modification Example 1-3

FIG. 12 illustrates a configuration example of an optical unit according to a modification example 1-3. In the foregoing modification example 2, polarized light emitted from the light source is p-polarized light, but may be s-polarized light. For example, as with the configuration of this modification example, each of the light Lb(s) in the blue band, the light Lr(s) in the red band, and the light Lg(s) in the green band may be emitted from the light source.

In this modification example, each of the light Lr(s) in the red band, the light Lg(s) in the green band, and the light Lb(s) in the blue band is emitted from the light source as s-polarized light. Moreover, the wavelength selective retardation film 13R1 similar to that in the foregoing modification example 2 is disposed between the incident surface S2 of the polarization splitter 11 and the light source. Note that, unlike the foregoing modification example 2, the retardation films (corresponding to the retardation films 14 and 20) are not necessary between the polarization splitter 11 and the polarization splitter 12RB and between the polarization splitter 11 and the polarization splitter 12G.

In the modification example, in the foregoing configuration, the light Lb(s) in the blue band emitted from the light source enters the incident surface S1 as s-polarized light. The light in the blue band (s-polarized light) is reflected by the optical functional film 11a to be outputted from the polarization splitter 11, and thereafter enters the polarization splitter 12RB. In contrast, the light Lg(s) in the green band and the light Lr(s) in the red band enter the wavelength selective retardation film 13R1. The wavelength selective retardation film 13R1 selectively rotates the polarization direction of the light in the red band, and outputs the light in the red band as p-polarized light (and outputs the light in the green band remaining as s-polarized light). Thus, the light in the red band enters the incident surface S2 of the polarization splitter 11 as p-polarized light, and the light in the green band enters the incident surface S2 of the polarization splitter 11 as s-polarized light. Accordingly, the light in the green band (s-polarized light) having entered the incident surface S2 is reflected by the optical functional film 11a to be outputted from the polarization splitter 11, and thereafter enters the polarization splitter 12G. The light in the red band (p-polarized light) having entered the incident surface S2 passes through the optical functional film 11a to be outputted from the polarization splitter 11, and thereafter enters the polarization splitter 12RB.

Thus, even in the modification example, as with the foregoing embodiment, it is possible to perform color separation and guide light in each of the wavelength bands to corresponding one of the light modulators 15R, 15G, and 15B without using the narrow band retardation film as in the comparative example. Moreover, optical design of the wavelength selective retardation film 13R1 is easy. This makes it possible to suppress leakage of the light in the green band into the light modulators 15R and 15B. Accordingly, effects similar to those in the foregoing embodiment are achievable.

Moreover, in the modification example, an optical path of the light Lb(s) in the blue band and an optical path of the light Lr(s) in the red band and the light Lg(s) in the green band are different from each other. This allows for a suitable layout for cases such as a case where a laser diode is used for the light source that emits light in the blue band, and a yellow phosphor (YAG) light source is used for the light source that emits light in the red band and light in the green band.

In addition, in the modification example, retardation films are not necessary between the polarization splitters 11 and 12G and between the polarization splitters 11 and 12RB, which makes it possible to reduce the number of components.

Modification Example 1-4

FIG. 13 illustrates a configuration of an optical unit according to a modification example 1-4 together with light sources (a yellow light source 21B and a blue light source 21C). The foregoing embodiment involves a configuration using one light source (the white light source) as an example of the light source that emits light in each of wavelength bands of RGB; however, as with the modification example, a plurality of light sources (the yellow light source 21B and the blue light source 21C) may be used. The yellow light source 21B is a light source that emits yellow light including the red band and the green band, and includes, for example, an LED using a YAG phosphor and a converter that converts light emitted from the LED into p-polarized light. Alternatively, the yellow light source 21B may include a laser diode that emits blue light and a YAG phosphor that converts light emitted from the laser diode into yellow light. The blue light source 21C includes, for example, a blue laser diode. Since light emitted from the laser diode is linearly polarized light, converting the emitted light into p-polarized light makes it possible to omit a polarization converter. The light emitted from the blue light source 21C is guided to the incident surface S1 with use of, for example, an optical path converter 223 such as a mirror.

The light source in the modification example is specifically effective in a case where light in a combination of the wavelength bands described in the foregoing modification examples 1-2 and 1-3 enters the polarization splitter 11. It is possible to guide the light emitted from the yellow light source 21B to the incident surface S2 of the polarization splitter 11 and guide the light emitted from the blue light source 21C to the incident surface S1 without using a color separator such as a dichroic mirror.

Modification Example 1-5

FIG. 14 illustrates a configuration of an optical unit according to a modification example 1-5 together with light sources (a red light source 21D, a blue light source 21C, and a green light source 21E). In a case where a plurality of light sources are used, the red light source 21D, the blue light source 21C, and the green light source 21E may be provided as with the modification example. Light emitted from the green light source 21E is guided to the incident surface S2 with use of, for example, an optical path converter 224 such as a mirror, and light emitted from the blue light source 21C is guided to the incident surface S1 with use of, for example, an optical path converter 225 such as a mirror.

Modification Example 1-6

FIG. 15 illustrates a configuration of an optical unit according to a modification example 1-6. The foregoing embodiment and examples involve a configuration using the polarization splitter (the polarizing beam splitter) as a color synthesizer as an example; however, the color synthesizer may be configured of a dichroic mirror, as with a color synthesizer 23 of the modification example. In this case, a retardation film and a wavelength selective retardation film are not necessary between the color synthesizer 23 and the polarization splitter 12G and between the color synthesizer 23 and the polarization splitter 12RB. This makes it possible to achieve effects similar to those in the foregoing embodiment, and to reduce the number of components more than in the foregoing embodiment. It is to be noted that the color synthesizer 23 is not limited to the dichroic prism, and may be a dichroic mirror.

Second Embodiment

Configuration

FIG. 16 illustrates a configuration of an optical unit (an optical unit 10A) in a projection display apparatus according to a second embodiment of the present disclosure together with a light source (for example, the white light source 21A) and the projection optical system 19. The optical unit 10A in the present embodiment is used for a projection display apparatus that projects an image on a screen (a projection surface) as with the optical unit 10 in the foregoing first embodiment.

The optical unit 10A modulates each of light of R, light of G, light of B derived from light (illumination light) outputted from the light source and combine the modulated light of R, the modulated light of G, and the modulated light of B on the basis of an image signal to generate image light, as with the optical unit 10 according to the foregoing first embodiment. The optical unit 10A includes, for example, three reflective light modulators (LCOS) for RGB. The optical unit 10A includes, for example, a color separator 41A, the polarization splitter 12G, the polarization splitter 12RB, the light modulators 15G, 15B, and 15R, the wavelength selective retardation film 16R, the retardation film 17, and the color synthesizer 18. The light source (the white light source 21A) is provided on light incident side of the optical unit 10A, and the projection optical system 19 is provided on light exit side of the optical unit 10A. The optical unit 10A is so configured as to allow light based on emitted light from the light source to enter the optical unit 10A from different directions. It is to be noted that the polarization splitter 12G in the present embodiment corresponds to a specific example of a "first polarization splitter" of a first projection display apparatus of the present disclosure, and the polarization splitter 12RB corresponds to a specific example of a "second polarization splitter" of the first projection display apparatus of the present disclosure.

The color separator 41A is, for example, an optical element that includes a dichroic mirror or a dichroic prism, and allows light in a selective wavelength band (color) of incident light to pass therethrough or reflects light in a selective band of the incident light. Specifically, the color separator 41A is so configured as to allow light in the green band and light in the red band to pass therethrough and as to reflect light in the blue band. The color separator 41A has, for example, two incident surfaces S1a and S1b (first and second incident surfaces).

In the configuration of the present embodiment, light in at least one wavelength band enters the incident surfaces S1a and S1b of the color separator 41A (from different incident directions). Moreover, light entering the incident surface S1a and light entering the incident surface S1b are, for example, linearly polarized light and orthogonal to each other. Specifically, light in two wavelength bands (for example, the green band and the blue band) enters the incident surface S1a as first polarized light (for example, S-polarized light), and light in the other one wavelength band (for example, the red band) enters the incident surface S1b as second polarized light (for example, P-polarized light). Accordingly, light in one band (for example, the green band) and light in the other two bands (for example, the blue band and the red band) selected from the light in the green band, the light in the blue band, and the light in the red band having entered the color separator 41A are outputted to different directions. The polarization splitter 12G and the polarization splitter 12RB are disposed in an optical path of outputted light from the color separator 41A.

It is to be noted that in the present embodiment, light in a wavelength band indicates light having an emission intensity peak in the wavelength band. For example, the "light in the green band" indicates light having an emission intensity peak in the green band. Moreover, the "green band" in the present embodiment corresponds to a specific example of a "first wavelength band" in the present disclosure. The "blue band" corresponds to a specific example of a "second wavelength band" in the present disclosure. The "red band" corresponds to a specific example of a "third wavelength band" in the present disclosure. Further, the green band is, for example, a band including a part or the entirety of a range from 500 nm to 580 nm both inclusive. The blue band is, for example, a band including a part or the entirety of a range from 430 nm to 490 nm both inclusive. The red band is, for example, a band including a part or the entirety of a range from 590 nm to 630 nm both inclusive.

Each of the light in the green band, the light in the blue band, and the light in the red band entering the color separator 41A is based on white light emitted from the white light source 21A. The color separator 410 such as a dichroic mirror, the optical path converters 411 and 412 such as mirrors, and other components are disposed on light exit side of the white light source 21A (in an optical path between the white light source 21A and the color separator 41A). Accordingly, white light emitted from the white light source 21A as, for example, S-polarized light is separated into combined light of light Lg(s) in the green band and light Lb(s) in the blue band, and light Lr(s) in the red band. Thereafter the combined light and the light Lr(s) in the red band are subjected to optical path conversion through the optical path converters 411 and 412, etc., and are guided to the color separator 41A. Moreover, the retardation film 14 (a half-wave plate) is disposed in an optical path of the light Lr in the red band between the color separator 410 and the color separator 41A.

It is to be noted that, for example, ¼ wave plates may be disposed between the light modulator 15G and the polarization splitter 12G and between the light modulators 15B and 15R and the polarization splitter 12RB. Providing the ¼ wave plates is advantageous in an improvement in contrast.

[Workings and Effects]

In the projection display apparatus according to the present embodiment, for example, light based on white light (S-polarized light) emitted from the white light source 21A enters the color separator 41A. Specifically, while the light Lg(s) in the green band and the light Lb(s) in the blue band selected from the three primary colors enter the incident surface S1a of the color separator 41A, the light Lr(p) in the red band selected from the three primary colors enters the incident surface S1b.

For example, after the light Lg(s) in the green band passes through the color separator 41A, the light Lg(s) in the green band enters the polarization splitter 12G. For example, after the light Lb(s) in the blue band is reflected by the color separator 41A, the light Lb(s) in the blue band enters the polarization splitter 12RB. For example, after the light Lr(p) in the red band passes through the color separator 41A, the light Lr(p) in the red band enters the polarization splitter 12RB. In other words, the light Lb(s) in the blue band and the light Lr(p) in the red band are combined on exit side of the color separator 41A, and thus-combined light enters the polarization splitter 12RB.

Here, the light Lb(s) in the blue band and the light Lr(p) in the red band having passed through the color separator 41A to be synthesized are polarized light and orthogonal to each other. Accordingly, the light Lb(s) is reflected by, for example, the polarization splitter 12RB (is subjected to optical path conversion) to enter the light modulator 15B. The light Lr(p) passes through, for example, the polarization splitter 12RB to enter the light modulator 15R. In contrast, the light Lg(s) in the green band is reflected by, for example, the polarization splitter 12G (is subjected to optical path conversion) to enter the light modulator 15G. In each of the light modulators 15R, 15G, and 15B, during image display (in the on state), a phase of each incident light is modulated to rotate polarization of the incident light.

Hence, the light in the green band modulated by the light modulator 15G is converted into P-polarized light, and passes through the polarization splitter 12G. The light in the green band having passed through the polarization splitter 12G passes through the retardation film 17 to be converted into S-polarized light. Accordingly, the light in the green band is reflected by the color synthesizer 18 (is subjected to optical path conversion) to enter the projection optical system 19. Moreover, the light in the blue band modulated by the light modulator 15B is converted into P-polarized light, and passes through the polarization splitter 12RB. The light in the red band modulated by the light modulator 15R is converted into S-polarized light, and is reflected by the polarization splitter 12RB. Accordingly, the modulated light in the blue band and the modulated light in the red band are combined again, and thus-combined light is outputted from the polarization splitter 12RB to enter the wavelength selective retardation film 16R. The wavelength selective retardation film 16R does not perform phase rotation on the light in the blue band, and functions as a half-wave plate only for the light in the red band. Hence, the light in the blue band passes through the wavelength selective retardation film 16R while the light in the blue band remains as P-polarized light, and the light in the red band passes through the wavelength selective retardation film 16R, which causes the wavelength selective retardation film 16R to rotate polarization of the light in the red band and thereby convert the light in the red band into P-polarized light. Thus, the light in the blue band and the light in the red band pass through the color synthesizer 18 to enter the projection optical system 19. The projection optical system 19 performs, for example, projection on the screen in a magnified form to perform display.

It is to be noted that operation in a case where the projection display apparatus is in the on state is described above. In a case where the projection display apparatus is in the off state, light is not modulated in any of the light modulators 15R, 15G, and 15B, and the polarization direction of the light is not rotated. Accordingly, light in each of the wavelength bands is not outputted from each of the polarization splitters 12G and 12RB to the projection lens, and is turned to the off state.

As described above, in the configuration of the present embodiment, the color separator 41A has two incident surfaces S1a and S1b, and light in two wavelength bands (for example, the green band and the blue band) enters the incident surfaces S1a of the two incident surfaces S1a and S1b as S-polarized light, and light in the other wavelength band (for example, the red band) enters the incident surface S1b as P-polarized light. As with the foregoing first embodiment, this makes it possible to separate light into light in the respective wavelength bands of RGB and guide the light in each of the wavelength bands of RGB to corresponding one of the light modulators 15R, 15G, and 15B without using the retardation film in which characteristic control is difficult. Alternatively, this makes it possible to decrease the number of such narrow band retardation films. Thus, effects similar to those in the foregoing first embodiment are achievable.

Moreover, in the present embodiment, the color separator 41A is used; therefore, the wavelength selective retardation film 13B in the foregoing first embodiment is not necessary. In general, the wavelength selective retardation film is typically made of an organic substance such as polycarbonate. Hence, it is desirable to set a temperature of the wavelength selective retardation film to a certain temperature or less. For example, in order to achieve, for example, a high-luminance projection display apparatus, an amount of passing light is increased, and it is therefore desirable to provide a heat exhaust mechanism or a cooling mechanism. In this respect, in the present embodiment, it is possible to reduce the number of wavelength selective retardation films, and it is not necessary to provide such a heat exhaust mechanism or any other mechanism. This is also advantageous in downsizing of the unit.

Modification Example 2-1

FIG. 17 illustrates configurations of an optical unit, light sources (a red light source 21D, a blue light source 21C, and a green light source 21E), and the projection optical system 19 in a projection display apparatus according to a modification example 2-1 of the foregoing second embodiment. The foregoing second embodiment involves a configuration using one light source (the white light source 21A) as an example of the light source that emits light in each of wavelength bands of RGB; however, as with the modification example, a plurality of light sources, for example, the red light source 21D, the blue light source 21C, and the green light source 21E may be used. Light Lg(s) emitted from the green light source 21E is guided to the incident surface S1a of the color separator 41A with use of, for example, an optical path converter 414 such as a mirror, and light Lb(s) emitted from the blue light source 21C is guided to the incident surface S1a of the color separator 41A. Light Lr(p) emitted from the red light source 21D is guided to the incident surface S1b of the color separator 41A with use of, for example, an optical path converter 413 such as a mirror.

Modification Example 2-2

FIG. 18 illustrates configurations of an optical unit, light sources (a yellow light source 21B and a blue light source 21C), and the projection optical system 19 in a projection display apparatus according to a modification example 2-2 of the foregoing second embodiment. In the foregoing second embodiment, the light in the green band and the light in the blue band enter the incident surface S1a of the color separator 41A, and the light in the red band enters the incident surface S1b; however, a combination of light in wavelength bands entering the two incident surfaces S1a and S1b is not limited thereto. For example, as with the modification example, a color separator 41B having two incident surfaces S1a and S1b may be used, and the light Lb(s) in the blue band (the second wavelength band) may enter the incident surface S1a of the color separator 41B, and the light Lg(p) in the green band (the first wavelength band) and the light Lr(p) in the red band (the third wavelength band) may enter the incident surface S1b.

The color separator 41B includes a dichroic mirror or a dichroic prism, as with the color separator 41A in the foregoing second embodiment, and is an optical element that allows light in a selective wavelength band (color) of incident light to pass therethrough or reflects light in a selective wavelength band of the incident light. Specifically, the color separator 41B is so configured as to allow the light in the red band to pass therethrough and as to reflect the light in the green band and the light in the blue band.

Accordingly, light in one band (for example, the green band) and light in the other two bands (for example, the blue band and the red band) selected from the light in the green band, the light in the blue band, and the light in the red band having entered the color separator 41B are outputted to different directions. The polarization splitter 12G and the polarization splitter 12RB are disposed in an optical path of outputted light from the color separator 41B. The retardation film 14 (a half-wave plate) is disposed between the color separator 41B and the polarization splitter 12G.

In the present modification example, the yellow light source 21B and the blue light source 21C may be used as light sources. The yellow light source 21B is a light source that emits yellow light including the red band and the green band, and includes, for example, an LED using a YAG phosphor and a converter that converts light emitted from the LED into p-polarized light. Alternatively, the yellow light source 21B may include a laser diode that emits blue light and a YAG phosphor that converts light emitted from the laser diode into yellow light. The blue light source 21C includes, for example, a blue laser diode. Since light emitted from the laser diode is linearly polarized light, converting the emitted light into p-polarized light makes it possible to omit a polarization converter. The light (the light Lg(p) and the light Lr(p)) emitted from the yellow light source 21B is guided to the incident surface S1b with use of, for example, an optical path converter 415 such as a mirror.

Thus, a combination of light in wavelength bands entering the two incident surfaces of the color separator is not particularly limited, and in addition to the foregoing example, for example, a configuration in which the light in the red band enters the incident surface S1a and the light in the green band and the light in the blue band enter the incident surface S1b may be adopted. Alternatively, a configuration in which the light in the green band and the light in the red band enter the incident surface S1a and the light in the blue band enters the incident surface S1b. Moreover, in the foregoing example, the first polarized light (S-polarized light) enters the incident surface S1a, and the second polarized light (P-polarized light) enters the incident surface S1b; however, the second embodiment is not limited thereto, and a configuration in which the P-polarized light enters the incident surface S1a and the S-polarized light enters the incident surface S1b may be adopted.

Although the description has been given by referring to some embodiments and the modification examples, the present disclosure is not limited thereto, and may be modified in a variety of ways. For example, components in the optical unit and the light source, positions of the components, and the number of components described in the foregoing embodiments and examples are illustrative, and all of the components are not necessarily provided, and other components may be further provided.

Moreover, in the foregoing embodiments and examples, as the first to third wavelength bands, the red band, the green band, and the blue band are described as an example; however, some of the wavelength bands may be any other wavelength band. Moreover, the number of wavelength bands is not limited to three, and light in another wavelength band, for example, a near-infrared band as a fourth wavelength band may be used. It may be only necessary that the polarization splitter 11 has two incident surfaces and light in one or more wavelength bands enters each of the two incident surfaces. Alternatively, it may be only necessary that the color separator 41A has two incident surfaces and light in one or more wavelength bands and light in one or more wavelength bands are polarized light orthogonal to each other enter the respective incident surfaces. It is to be noted that the effects described in the present specification are illustrative and non-limiting. Effects achieved by the present disclosure may be effects other than those described above.

Further, the present technology may have the following configurations.

(1)

A projection display apparatus, including:
  a color separator that has a first incident surface and a second incident surface, and allows light in first to third wavelength bands having entered the first and second incident surfaces to pass therethrough or reflects the light in the first to third wavelength bands;
  first to third reflective light modulators that respectively modulates the light in the first to third wavelength bands;
  a first polarization splitter that guides the light in the first wavelength band outputted from the color separator to the first reflective light modulator;
  a second polarization splitter that guides the light in the second wavelength band outputted from the color separator to the second reflective light modulator and guides the light in the third wavelength band outputted from the color separator to the third reflective light modulator; and
  a projection optical system that projects light in respective wavelength bands outputted from the first to third reflective light modulators,
  in which light in at least one wavelength selected from the first to third wavelength bands enters the first incident surface of the color separator as first polarized light, and light in the other wavelength bands enters the second incident surface of the color separator as second polarized light orthogonal to the first polarized light.

(2)

The projection display apparatus according to (1), in which the light in the first wavelength and the light in the second wavelength band enter one surface of the first and second incident surfaces of the color separator, and the light in the third wavelength band enters the other surface of the first and second incident surfaces.

(3)

The projection display apparatus according to (1), in which the light in the second wavelength band enters one surface of the first and second incident surfaces of the color separator, and the light in the first wavelength band and the light in the third wavelength band enter the other surface of the first and second incident surfaces.

(4)

The projection display apparatus according to any one of (1) to (3), in which the color separator includes a dichroic mirror or a dichroic prism.

(5)

The projection display apparatus according to any one of (1) to (3), in which the first to third wavelength bands are a green band, a blue band, and a red band.

(6)

The projection display apparatus according to any one of (1) to (5), further including one or a plurality of light sources that emit light in the first to third wavelength bands as polarized light.

(7)

The projection display apparatus according to (6), in which the one light source is a white light source that emits white light.

(8)

The projection display apparatus according to (6), in which the plurality of light sources includes a blue light source that emits light in a blue band, and
a yellow light source that emits yellow light including a green band and a red band.

(9)
The projection display apparatus according to (6), in which the plurality of light sources includes a green light source that emits light in a green band, a blue light source that emits light in a blue band, and a red light source that emits light in a red band.

(10)
The projection display apparatus according to any one of (1) to (9), further including a light synthesizer that synthesizes the light in the respective wavelength bands outputted from the first to third reflective light modulators.

(11)
A projection display apparatus, including:
a first polarization splitter that has a first incident surface and a second incident surface, and is disposed to allow light in one wavelength band selected from first to third wavelength bands to enter the first incident surface and to allow light in the other two wavelength bands selected from the first to third wavelength bands to enter the second incident surface;
first to third reflective light modulators that respectively modulate light in the first to third wavelength bands;
a second polarization splitter that guides light in the first wavelength band outputted from the first polarization splitter to the first reflective light modulator;
a third polarization splitter that guides light in the second wavelength band outputted from the first polarization splitter to the second reflective light modulator and guides light in the third wavelength band outputted from the first polarization splitter to the third reflective light modulator; and
a projection optical system that projects light in respective wavelength bands outputted from the first to third reflective light modulators.

(12)
The projection display apparatus according to (11), further including one or a plurality of light sources that emit the light in the first to third wavelength bands as polarized light.

(13)
The projection display apparatus according to (12), in which a wavelength selective retardation film is disposed in an optical path between the light source and the second polarization splitter or in an optical path between the light source and the third polarization splitter, the wavelength selective retardation film selectively rotating a polarization direction of light in one wavelength band selected from light in two wavelength bands entering the second incident surface of the first polarization splitter.

(14)
The projection display apparatus according to (13), in which the first polarization splitter is disposed to allow the light in the first wavelength band to enter the first incident surface and to allow the light in the second band and the light in third wavelength band to enter the second incident surface.

(15)
The projection display apparatus according to (14), in which
each of the light in the first wavelength band, the light in the second wavelength band, and the light in the third wavelength band is emitted from the light source as first polarized light that passes through an optical surface of the first polarization splitter, and
the wavelength selective retardation film is disposed between the first polarization splitter and the third polarization splitter, and selectively rotates a polarization direction of the light in the second wavelength band selected from the second and third wavelength bands entering the wavelength selective retardation film and outputs the light in the second wavelength band to the third polarization splitter.

(16)
The projection display apparatus according to (14), in which
each of the light in the first wavelength band, the light in the second wavelength band, and the light in the third wavelength band is emitted from the light source as second polarized light that is reflected by an optical surface of the first polarization splitter, and
the wavelength selective retardation film is disposed between the first polarization splitter and the third polarization splitter, and selectively rotates a polarization direction of the light in the third wavelength band selected from the second wavelength and the third wavelength band entering the wavelength selective retardation film, and outputs the light in the third wavelength band to the third polarization splitter.

(17)
The projection display apparatus according to (13), in which the first polarization splitter is disposed to allow the light in the second wavelength band to enter the first incident surface and to allow the light in the first wavelength band and the light in the third wavelength band to enter the second incident surface.

(18)
The projection display apparatus according to (17), in which
each of the light in the first wavelength band, the light in the second wavelength band, and the light in the third wavelength band is emitted from the light source as first polarized light that passes through an optical surface of the first polarization splitter, and
the wavelength selective retardation film is disposed between the light source and the second incident surface of the first polarization splitter, and selectively rotates a polarization direction of the light in the third wavelength band selected from the first wavelength band and the third wavelength band entering the wavelength selective retardation film and outputs the light in the third wavelength band to the first polarization splitter.

(19)
The projection display apparatus according to (17), in which
each of the light in the first wavelength band, the light in the second wavelength band, and the light in the third wavelength band is emitted from the light source as second polarized light that is reflected by an optical surface of the first polarization splitter, and
the wavelength selective retardation film is disposed between the light source and the second incident surface of the first polarization splitter, and selectively rotates a polarization direction of the light in the third wavelength band selected from the first wavelength band and the third wavelength band entering the wavelength selective retardation film and outputs the light in the third wavelength band to the first polarization splitter.

(20)
The projection display apparatus according to any one of (11) to (19), in which the first polarization splitter includes a polarizing beam splitter.

The present application is based on and claims priority from Japanese Patent Application No. 2015-093237 filed in the Japan Patent Office on Apr. 30, 2015, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A projection display apparatus, comprising:
a color separator that has a first incident surface and a second incident surface, and allows light in first to third wavelength bands having entered the first incident surface and the second incident surface to pass therethrough or reflects the light in the first to third wavelength bands;
first to third reflective light modulators that respectively modulates the light in the first to third wavelength bands;
a first polarization splitter that guides the light in the first wavelength band outputted from the color separator to the first reflective light modulator;
a second polarization splitter that guides the light in the second wavelength band outputted from the color separator to the second reflective light modulator and guides the light in the third wavelength band outputted from the color separator to the third reflective light modulator; and
a projection optical system that projects light in respective wavelength bands outputted from the first to third reflective light modulators,
wherein light in at least one wavelength selected from the first to third wavelength bands enters the first incident surface of the color separator as first polarized light, and light in other wavelength bands of the first to third wavelength bands enters the second incident surface of the color separator as second polarized light orthogonal to the first polarized light.

2. The projection display apparatus according to claim 1, wherein the light in the first wavelength band and the light in the second wavelength band enter one surface of the first incident surface and the second incident surface of the color separator, and the light in the third wavelength band enters other surface of the first incident surface and the second incident surface.

3. The projection display apparatus according to claim 1, wherein the light in the second wavelength band enters one surface of the first incident surface and the second incident surface of the color separator, and the light in the first wavelength band and the light in the third wavelength band enter other surface of the first incident surface and the second incident surface.

4. The projection display apparatus according to claim 1, wherein the color separator includes a dichroic mirror or a dichroic prism.

5. The projection display apparatus according to claim 1, wherein the first to third wavelength bands are a green band, a blue band, and a red band.

6. The projection display apparatus according to claim 1, further comprising at least one light source that emits light in the first to third wavelength bands as polarized light.

7. The projection display apparatus according to claim 6, wherein the at least one light source is a white light source that emits white light.

8. The projection display apparatus according to claim 6, wherein the at least one light source includes
a blue light source that emits light in a blue band, and
a yellow light source that emits yellow light including a green band and a red band.

9. The projection display apparatus according to claim 6, wherein the at least one light source includes a green light source that emits light in a green band, a blue light source that emits light in a blue band, and a red light source that emits light in a red band.

10. The projection display apparatus according to claim 1, further comprising a light synthesizer that synthesizes the light in the respective wavelength bands outputted from the first to third reflective light modulators.

11. A projection display apparatus, comprising:
a first polarization splitter that has a first incident surface and a second incident surface, and is disposed to allow light in one wavelength band selected from first to third wavelength bands to enter the first incident surface and to allow light in other two wavelength bands selected from the first to third wavelength bands to enter the second incident surface;
first to third reflective light modulators that respectively modulate light in the first to third wavelength bands;
a second polarization splitter that guides the light in the first wavelength band outputted from the first polarization splitter to the first reflective light modulator;
a third polarization splitter that guides the light in the second wavelength band outputted from the first polarization splitter to the second reflective light modulator and guides the light in the third wavelength band outputted from the first polarization splitter to the third reflective light modulator; and
a projection optical system that projects light in respective wavelength bands outputted from the first to third reflective light modulators.

12. The projection display apparatus according to claim 11, further comprising at least one light source that emits the light in the first to third wavelength bands as polarized light.

13. The projection display apparatus according to claim 12, wherein a wavelength selective retardation film is disposed in an optical path between the at least one light source and the second polarization splitter or in an optical path between the at least one light source and the third polarization splitter, the wavelength selective retardation film selectively rotating a polarization direction of light in one wavelength band selected from light in two wavelength bands entering the second incident surface of the first polarization splitter.

14. The projection display apparatus according to claim 13, wherein the first polarization splitter is disposed to allow the light in the first wavelength band to enter the first incident surface and to allow the light in the second wavelength band and the light in third wavelength band to enter the second incident surface.

15. The projection display apparatus according to claim 14, wherein
each of the light in the first wavelength band, the light in the second wavelength band, and the light in the third wavelength band is emitted from the at least one light source as first polarized light that passes through an optical surface of the first polarization splitter, and
the wavelength selective retardation film is disposed between the first polarization splitter and the third polarization splitter, and selectively rotates a polarization direction of the light in the second wavelength band selected from the second wavelength band and the third wavelength band entering the wavelength selective retardation film and outputs the light in the second wavelength band to the third polarization splitter.

16. The projection display apparatus according to claim 14, wherein each of the light in the first wavelength band, the light in the second wavelength band, and the light in the third wavelength band is emitted from the at least one light source as second polarized light that is reflected by an optical surface of the first polarization splitter, and the wavelength selective retardation film is disposed between the first polarization splitter and the third polarization splitter, and selectively rotates a polarization direction of the light in the third wavelength band selected from the second wavelength band and the third wavelength band entering the wavelength selective retardation film, and outputs the light in the third wavelength band to the third polarization splitter.

17. The projection display apparatus according to claim 13, wherein the first polarization splitter is disposed to allow the light in the second wavelength band to enter the first incident surface and to allow the light in the first wavelength band and the light in the third wavelength band to enter the second incident surface.

18. The projection display apparatus according to claim 17, wherein each of the light in the first wavelength band, the light in the second wavelength band, and the light in the third wavelength band is emitted from the at least one light source as first polarized light that passes through an optical surface of the first polarization splitter, and the wavelength selective retardation film is disposed between the at least one light source and the second incident surface of the first polarization splitter, and selectively rotates a polarization direction of the light in the third wavelength band selected from the first wavelength band and the third wavelength band entering the wavelength selective retardation film and outputs the light in the third wavelength band to the first polarization splitter.

19. The projection display apparatus according to claim 17, wherein each of the light in the first wavelength band, the light in the second wavelength band, and the light in the third wavelength band is emitted from the at least one light source as second polarized light that is reflected by an optical surface of the first polarization splitter, and the wavelength selective retardation film is disposed between the at least one light source and the second incident surface of the first polarization splitter, and selectively rotates a polarization direction of the light in the third wavelength band selected from the first wavelength band and the third wavelength band entering the wavelength selective retardation film and outputs the light in the third wavelength band to the first polarization splitter.

20. The projection display apparatus according to claim 11, wherein the first polarization splitter includes a polarizing beam splitter.

* * * * *